United States Patent
Zhao et al.

(10) Patent No.: US 12,457,300 B2
(45) Date of Patent: Oct. 28, 2025

(54) GENERATING STYLIZED IMAGES ON MOBILE DEVICES

(71) Applicant: Adobe Inc., San Jose, CA (US)

(72) Inventors: Wentian Zhao, San Jose, CA (US); Kun Wan, San Jose, CA (US); Xin Lu, Mountain View, CA (US); Jen-Chan Jeff Chien, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 250 days.

(21) Appl. No.: 18/309,410

(22) Filed: Apr. 28, 2023

(65) Prior Publication Data

US 2023/0262189 A1 Aug. 17, 2023

Related U.S. Application Data

(62) Division of application No. 17/073,697, filed on Oct. 19, 2020, now Pat. No. 11,677,897.

(51) Int. Cl.
*H04N 5/262* (2006.01)
*G06T 5/73* (2024.01)
(Continued)

(52) U.S. Cl.
CPC ............ *H04N 5/2621* (2013.01); *G06T 5/73* (2024.01); *G06V 10/40* (2022.01); *G06V 10/56* (2022.01);
(Continued)

(58) Field of Classification Search
CPC .... H04N 5/2621; H04N 5/265; H04N 23/631; H04N 23/632; G06T 5/73; G06V 10/40;
(Continued)

(56) References Cited

U.S. PATENT DOCUMENTS 10,909,657 B1 * 2/2021 Rossi ...................... G06F 18/22
2018/0075581 A1 * 3/2018 Shi .......................... G06N 3/045
(Continued)

FOREIGN PATENT DOCUMENTS

JP 2020010331 A 1/2020

OTHER PUBLICATIONS

Ahn et al, Texture Enhancement via High-Resolution Style Transfer for Single Image Super Resolution, 2016, IEEE Transactions on Consumer Electronics, arXiv: 1612.00085, pp. 1-10. (Year: 2016).*

(Continued)

*Primary Examiner* — Kathleen M Broughton
(74) *Attorney, Agent, or Firm* — Keller Preece PLLC

(57) ABSTRACT

Methods, systems, and non-transitory computer readable media are disclosed for generating artistic images by applying an artistic-effect to one or more frames of a video stream or digital images. In one or more embodiments, the disclosed system captures a video stream utilizing a camera of a computing device. The disclosed system deploys a distilled artistic-effect neural network on the computing device to generate an artistic version of the captured video stream at a first resolution in real time. The disclosed system can provide the artistic video stream for display via the computing device. Based on an indication of a capture event, the disclosed system utilizes the distilled artistic-effect neural network to generate an artistic image at a higher resolution than the artistic video stream. Furthermore, the disclosed system tunes and utilizes an artistic-effect patch generative adversarial neural network to modify parameters for the distilled artistic-effect neural network.

20 Claims, 13 Drawing Sheets

(51) Int. Cl.
*G06V 10/40* (2022.01)
*G06V 10/56* (2022.01)
*G06V 10/82* (2022.01)
*H04N 5/265* (2006.01)
*H04N 23/63* (2023.01)

(52) U.S. Cl.
CPC ............ *G06V 10/82* (2022.01); *H04N 5/265* (2013.01); *H04N 23/631* (2023.01); *H04N 23/632* (2023.01)

(58) Field of Classification Search
CPC ........ G06V 10/56; G06V 10/82; G06N 3/045; G06N 3/08
See application file for complete search history.

(56) References Cited

U.S. PATENT DOCUMENTS

| | | | |
|---|---|---|---|
| 2018/0103213 A1* | 4/2018 | Holzer | H04N 23/632 |
| 2019/0130229 A1 | 5/2019 | Lu et al. | |
| 2020/0258206 A1 | 8/2020 | Shen et al. | |
| 2020/0380639 A1* | 12/2020 | Rossi | G06T 3/4046 |

OTHER PUBLICATIONS

Ye et al, Japanese Animation Style Transfer Using Deep Neural Networks, 2017, International Conference on Information, Communication and Engineering, pp. 1-5. (Year: 2017).*

Pandey et al, Computationally Efficient Approaches for Image Style Transfer, 2018, 15th ieeE India Council International Conference, pp. 1-7. (Year: 2018).*

Chen et al, StyleBank: An Explicit Representation for Neural Image Style Transfer, 2017, arXiv:1703.09210v2, pp. 1-10. (Year: 2017).*

Cao et al, Development of Real-Time Style Transfer for Video Stream, 2019, 3rd International Conference on Circuits, Systems and Simulation, pp. 1-6. (Year: 2019).*

Texler et al, Interactive Video Stylization Using Few-Shot Patch-Based Training, 2020, arXiv:2004.14489v1, pp. 1-11. (Year: 2020).*

J. Johnson, A. Alahi, and L. Fei-Fei "Perceptual losses for real-time style transfer and superresolution," in Computer Vision—ECCV 2016—14th European Conference, Amsterdam, The Netherlands, Oct. 11-14, 2016, Proceedings, Part II (B. Leibe, J. Matas, N. Sebe, and M. Welling, eds.), vol. 9906 of Lecture Notes in Computer Science, pp. 694-711, Springer, 2016.

J. Zhu, T. Park, P. Isola, and A. A. Efros, "Unpaired image-to-image translation using cycleconsistent adversarial networks," in IEEE International Conference on Computer Vision, ICCV 2017, Venice, Italy, Oct. 22-29, 2017, pp. 2242-2251, IEEE Computer Society, 2017.

X. Mao, Q. Li, H. Xie, R. Y. K. Lau, Z. Wang and S. P. Smolley, "Least Squares Generative Adversarial Networks," 2017 IEEE International Conference on Computer Vision (ICCV), Venice, 2017, pp. 2813-2821, doi: 10.1109/ICCV.2017.304.

P. Isola, J. Zhu, T. Zhou and A. A. Efros, "Image-to-Image Translation with Conditional Adversarial Networks," 2017 IEEE Conference on Computer Vision and Pattern Recognition (CVPR), Honolulu, HI, 2017, pp. 5967-5976, doi: 10.1109/CVPR.2017.632.

Li et al, Convolutional Neural Network-Based Block Up-Sampling for Intra Frame Coding, 2018, IEEE, 28:9; 2316-2330. (Year: 2018) (Year: 2018).

Li et al, Precomputed Real-Time Texture Synthesis with Markovian Generative Adversarial Networks, 2016, ECCV 2016, Part III, LNCS 9907,pp. 702-716. (Year: 2016).

Lin et al., Convolutional Neural Network-Based Block Up-Sampling for HEVC, 2019, IEEE, 29:12; 3701-3715. (Year: 2019) (Year: 2019).

U.S. Appl. No. 17/073,697, Aug. 17, 2022, Preinterview 1st Office Action.

U.S. Appl. No. 17/073,697, Oct. 3, 2022, 1st Action Office Action.

U.S. Appl. No. 17/073,697, Feb. 1, 2023, Notice of Allowance.

* cited by examiner

GENERATING STYLIZED IMAGES ON MOBILE DEVICES

CROSS-REFERENCE TO RELATED APPLICATIONS

The present application is a divisional of U.S. application Ser. No. 17/073,697, filed on Oct. 19, 2020. The aforementioned application is hereby incorporated by reference in its entirety.

BACKGROUND

Recent years have witnessed a significant increase in digital photography, particularly with the improvements and availability of digital cameras on mobile devices. Indeed, both hardware and software advances allow for incorporation of digital cameras within a large number of mobile computing devices, such as tablets, smartphones, and wearable devices. As a result, individuals have greater ability than ever before to capture photographs at a moment's notice. Additionally, many mobile computing devices have the ability to modify captured images by applying effects, enhancements, styles, and other edits to digital images in real time.

Notwithstanding these improvements, mobile devices are lacking in some areas, particularly with respect to ability to modify captured images. More specifically, conventional systems often face processing resource shortcomings that prevent accurate, efficient, and flexible editing of images. More specifically, some conventional systems attempt to utilize neural networks to enhance digital images. A primary drawback of these systems is that they are often inefficient. For example, conventional systems have significant shortfalls in relation to generating high-resolution stylized images. Indeed, most conventional systems must utilize time- and computing-resource-intensive methods to create stylized images. Conventional systems often deploy neural networks on centralized servers. Thus, conventional systems often require the use of additional memory and computing resources in transferring digital images from client devices to the centralized server and the stylized images from the centralized server to the client device.

A significant drawback of conventional systems is that they typically cannot create high-resolution stylized images on handheld devices. The computing resources required for image processing can make it difficult or impossible to perform such operations using handheld devices (e.g., smart phones or tablets). While some conventional systems may be implemented on hand-held devices, many are limited to utilization of newer model devices comprising updated processors. Even conventional systems that function on handheld devices are limited to creating low-resolution stylized images.

These, along with additional problems and issues exist with regard to generating processed images on mobile computing devices.

BRIEF SUMMARY

One or more embodiments provide benefits and/or solve one or more problems in the art with systems, methods, and non-transitory computer readable storage media for accurately and efficiently generating stylized images (e.g., anime images) on mobile devices in real time. In particular, the disclosed systems generate and utilize a lightweight neural network that is deployable on mobile devices. For example, the lightweight neural network receives a live video stream from a camera of a mobile device. The lightweight neural network applies an artistic-effect to the received digital visual stream to generate a synthesized artistic video stream. The disclosed systems provide the synthesized artistic video stream in real time on a viewfinder of the mobile device. Furthermore, the lightweight neural network is able to generate high resolution artistic image directly on the mobile device.

To generate the lightweight neural network, the disclosed systems utilize a generative adversarial network to learn a mapping between real world digital photographs and stylized images. To enhance performance of the generative adversarial network, the disclosed systems utilize a plurality of constraints. For example, the disclosed systems utilize one or more of a content constraint, a style constraint, a color constraint, or a blur constraint. The disclosed systems then utilize model distillation to generate the lightweight neural network from the generative adversarial network. Optionally, the disclosed systems utilize one or more of the content constraint, the style constraint, the color constraint, or the blur constraint in connection with generating the lightweight neural network.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
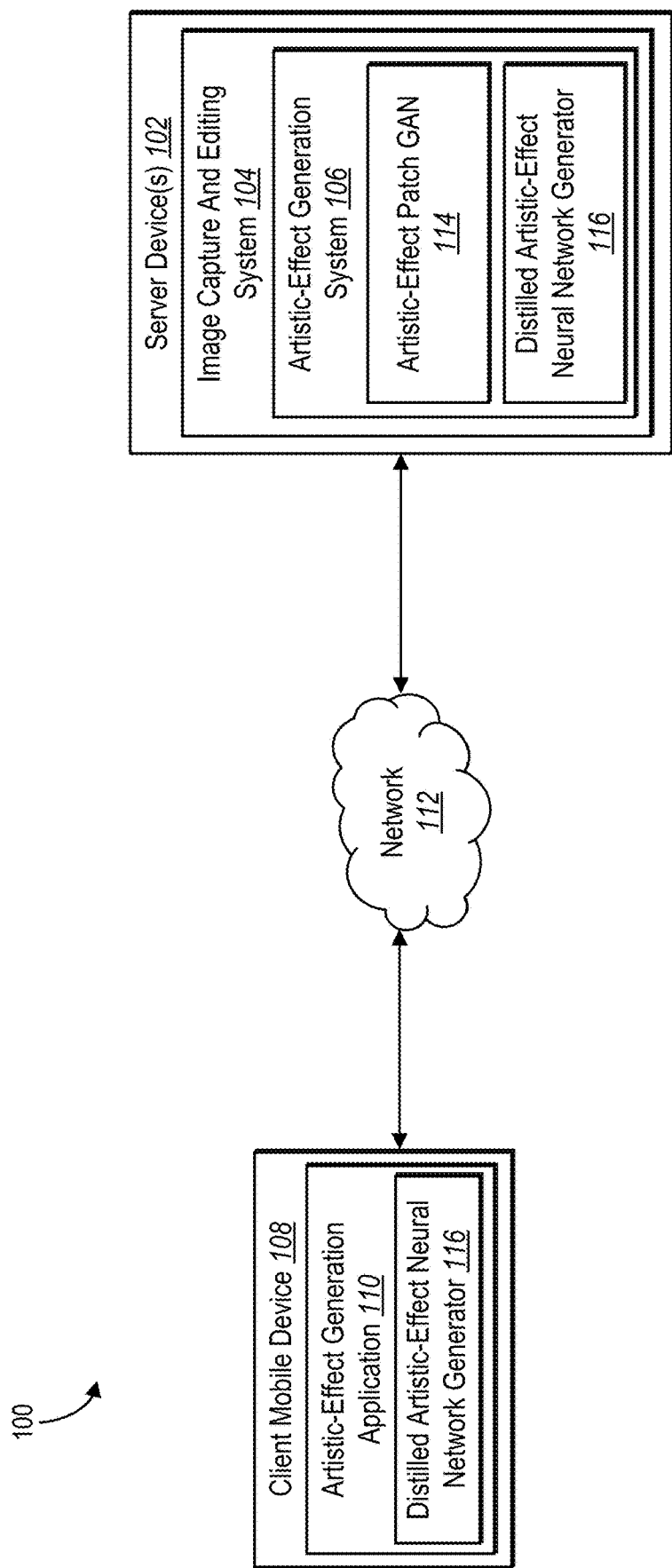
FIG. 1 illustrates an environment in which an artistic-effect generation system can operate in accordance with one or more embodiments of the present disclosure.

One or more embodiments of the disclosure include an artistic-effect generation system that utilizes a distilled artistic-effect neural network generator to generate artistic images from real-world images in real-time. In particular, one or more embodiments include a distilled artistic-effect neural network generator that is deployable on mobile devices and capable of generating high-resolution artistic images or videos (e.g., anime images or video). For example, the distilled artistic-effect neural network generator receives a live video stream from a camera of a mobile device. The distilled artistic-effect neural network generator applies an artistic-effect to the received digital visual stream to generate a synthesized artistic video stream. One or more embodiments provide the synthesized artistic video stream in real time on a viewfinder of the mobile device allowing for a live preview of the artistic effect. In response to user input to capture an image or video, the distilled artistic-effect neural network generator generates a high-resolution synthesized artistic-effect digital image or video.

To generate the distilled artistic-effect neural network generator, the artistic-effect generation system utilizes a generative adversarial network to learn a mapping between real world digital photographs and stylized images. To enhance performance of the generative adversarial network, the artistic-effect generation system utilizes a plurality of constraints in addition to a generator and discriminator loss. For example, the artistic-effect generation system utilizes one or more of a content constraint, a style constraint, a color constraint, or a blur constraint. The artistic-effect generation system then utilizes model distillation to generate the distilled artistic-effect neural network generator from the generative adversarial network. Optionally, the artistic-effect generation system utilizes one or more of the content constraint, the style constraint, the color constraint, or the blur constraint in connection with generating the distilled artistic-effect neural network generator.

As mentioned, as part of generating the distilled artistic-effect neural network generator, the artistic-effect generation system utilizes a larger generative adversarial neural network to learn a mapping between real-work images and artistic images. In one or more embodiments, the artistic-effect generation system utilizes a patch generative adversarial neural network, referred to herein as an artistic-effect patch GAN. Generally, the artistic-effect generation system tunes a generator of the artistic-effect patch GAN to create high resolution artistic video streams and/or artistic images from input video streams and/or images.

In particular, the artistic-effect generation system utilizes a discriminator of an artistic-effect patch GAN to aid in learning parameters for a generator of the artistic-effect patch GAN. In some embodiments, the artistic-effect generation system learns the mappings between real-world images and artistic images utilizing two datasets—one dataset comprising real-world input images (e.g., photographs and/or videos) and the other dataset comprising authentic artistic images (e.g., anime images or other stylized images). The artistic-effect generation system utilizes the generator of the artistic-effect patch GAN to generate synthesized artistic images from the input images. The artistic-effect generation system utilizes the discriminator of the artistic-effect patch GAN to generate classifications of patches of the synthesized artistic images as real or fake as compared with patches of the authentic artistic images. The artistic-effect generation system adjusts parameters of the larger patch generator neural network based on a generator loss and a discriminator loss based on the classifications of the discriminator.

The artistic-effect generation system also fine tunes the parameters of the generator of the artistic-effect patch GAN by applying multiple constraints to the generator and the discriminator of the artistic-effect patch GAN. In particular, in some embodiments, the artistic-effect generation system extracts features from the real-world input images, the synthesized artistic images, and the authentic artistic images. Additionally, the artistic-effect generation system generates comparisons between the features of the synthesized artistic images, the features of the input images, and the features of the authentic artistic images. In one example, the artistic-effect generation system generates a content loss, a style loss, and a color loss based on comparing the features. The artistic-effect generation then updates or modifies the parameters of the artistic-effect patch GAN based on these losses to improve the quality and accuracy of artistic images generated by the generator of the artistic-effect patch GAN.

In some embodiments, the artistic-effect generation system further improves the quality of synthesized artistic images by modifying parameters of the discriminator of the artistic-effect patch GAN. In particular, the artistic-effect generation system penalizes low-quality synthesized artistic images by back-propagating one or more losses to the discriminator. For example, in at least one embodiment, the artistic-effect generation system utilizes a blur loss to update the parameters of the discriminator. The artistic-effect generation system utilizes the blur loss to penalize blurred synthesized artistic images created by the generator. To optimize the blur loss, the generator is encouraged to output synthesized artistic images with sharper edges.

By fine tuning the parameters of the artistic-effect patch GAN, the artistic-effect generation system enhances the ability of the generator of the artistic-effect patch GAN to generate authentic appearing stylized digital images. While the artistic-effect patch GAN is capable of generating high-quality artistic images, the size of the artistic-effect patch GAN may prevent efficient deployment of the artistic-effect patch GAN on mobile devices or other computing devices with limited computing resources. As mentioned, the artistic-effect generation system creates a lightweight distilled artistic-effect neural network generator from the artistic-effect patch GAN. In particular, the artistic-effect generation system utilizes model distillation to compress the generator of the artistic-effect patch GAN to create the distilled artistic-effect neural network generator. Because the distilled artistic-effect neural network generator comprises a smaller model and is less expensive to evaluate, the distilled artistic-effect neural network generator is suitable for deployment on mobile devices. Furthermore, in one or more embodiments, the artistic-effect generation system utilizes the distilled artistic-effect neural network generator to create high quality artistic images in real time.

As mentioned, the artistic-effect generation system utilizes model distillation to compress the generator of the artistic-effect patch GAN to create the distilled artistic-effect neural network generator. Specifically, the artistic-effect generation system utilizes the outputs of the artistic-effect patch GAN to supervise the distilled artistic-effect neural network generator in learning the final logit output. For example, the artistic-effect generation system utilizes the generator of the artistic-effect patch GAN to create a target artistic image and the distilled artistic-effect neural network generator to create a learning artistic image. The artistic-effect generation system modifies parameters of the distilled artistic-effect neural network generator based on a comparison between the target artistic image and the learning artistic image. More specifically, the artistic-effect generation system generates the comparison by generating a mean squared error loss.

Additionally, the artistic-effect generation system further improves the distilled artistic-effect neural network generator by incorporating additional constraints. In some embodiments, the artistic-effect generation system employs a joint loss training by incorporating a content loss, style loss, and color loss when modifying parameters of the distilled artistic-effect neural network generator. For example, the artistic-effect generation system extracts features from a learning artistic image, a sample input image, and a target artistic image. In particular, in some embodiments, the artistic-effect generation system extracts features from a learning artistic image, a sample input image, and a target artistic image. Additionally, the artistic-effect generation system generates comparisons between the features of the learning artistic image, the features of the sample input image, and the features of the target artistic image. In one example, the artistic-effect generation system generates a content loss, a style loss, and a color loss based on comparing the features. The artistic-effect generation then updates or modifies the parameters of the distilled artistic-effect neural network generator based on these losses to improve the quality and accuracy of artistic images generated by the distilled artistic-effect neural network generator.

As previously mentioned, the artistic-effect generation system provides numerous advantages, benefits, and practical applications over conventional systems. The artistic-effect generation system improves accuracy relative to conventional systems. For example, the artistic-effect generation system generates artistic images that are more temporally consistent and smooth compared to stylized images generated by conventional systems. In particular, the artistic-effect generation improves the accuracy of synthesized artistic images by utilizing a distilled artistic-effect neural network generator tuned with the use of a larger patch generator neural network. More specifically, by introducing various constraints while learning parameters for both neural networks, the artistic-effect generation system makes improvements to accuracy relative to conventional systems.

Furthermore, the artistic-effect generation system makes improvements to efficiency relative to conventional systems. In particular, the artistic-effect generation system compresses the larger generator of the artistic-effect patch GAN that yields temporally consistent artistic images. For example, the artistic-effect generation system generates a more lightweight distilled artistic-effect neural network generator. The distilled artistic-effect neural network generator requires the use of fewer computing and storage resources to generate high-resolution artistic images. More specifically, the architecture of the distilled artistic-effect neural network generator consists of a limited number of convolutional blocks. The artistic-effect generation system further implements efficient separable convolutions for blocks within the distilled artistic-effect neural network generator to decrease the amount of computing resources required by the distilled artistic-effect neural network generator. Thus, the artistic-effect generation system can utilize the distilled artistic-effect neural network generator to generate high resolution synthesized artistic images in real time.

The artistic-effect generation system overcomes additional limitations of conventional systems because the artistic-effect generation system deploys the distilled artistic-effect neural network generator on handheld devices. Due, in part, to the lightweight size of the distilled artistic-effect neural network generator, the distilled artistic-effect neural network generator efficiently operates on mobile client devices (e.g., handheld devices) even those with older processing systems and/or hardware.

Additional advantages and benefits of the artistic-effect generation system will become apparent in view of the following description. Further, as illustrated by the foregoing discussion, the present disclosure utilizes a variety of terms to describe features and advantages of the artistic-effect generation system. The following paragraphs provide additional detail regarding the meaning of such terms.

As used herein, the term "artistic-effect" refers to an effect that, when applied to a media item, achieves a specific artistic look. In particular, when applied, an artistic-effect changes the appearance of a media item (e.g., an image or video) to mimic an artistic style. For example, in some embodiments, artistic-effects change the appearance of an image to mimic anime images, painted images, or other artistic styles.

As used herein, the term "neural network" refers to a machine learning model that can be tuned (e.g., trained) based on inputs to approximate unknown functions. In particular, a neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), a recurrent neural network (e.g., a long short-term memory neural network, a generative adversarial neural network (GAN), a patch generative adversarial neural network (artistic-effect patch GAN), a distilled neural network, or another multi-layer neural network. In some embodiments, a neural network includes a combination of neural networks or neural network components.

As used herein, the term "distilled artistic-effect neural network generator" refers to a computer-implemented neural network that generates synthesized artistic versions of digital media items. In particular, a distilled neural network analyzes input digital media such as a video stream and generates a synthesized artistic video stream and/or an artistic image. In some embodiments, the distilled artistic-effect neural network generator comprises a lightweight neural network that can be deployed on a mobile device.

As used herein, the term "video stream" refers to a video feed of a digital camera. In particular, a video stream refers to a live presentation of digital video as the digital video is captured in real-time by a digital camera. For example, a video stream includes a live feed of digital video that is received by a computing device that is capturing the live feed of the digital video. In some embodiments, a video stream includes a live feed of a digital video captured (and displayed) by a single computing device such as a mobile computing device (e.g., a smartphone) having an integrated camera. In one or more embodiments, a video stream comprises one or more video frames. As used herein, the term a "frame" refers to one still image of a series that compose a video. In particular, a frame comprises a single still image within a video stream. For example, a video stream comprises a plurality of frames.

As used herein, the term "synthesized artistic video stream" refers to an artistic version of a video stream. In particular, a synthesized artistic video stream comprises video frames in an artistic style. For example, an artistic video stream comprises anime video frames that correspond to a plurality of frames from a video stream.

Relatedly, as used herein, the term "artistic image" refers to an image in an artistic style. In particular, an artistic image includes an image to which an artistic-effect has been applied. For example, an artistic image comprises an anime version of a corresponding real-world image. In some embodiments, an artistic image comprises a frame from a synthesized artistic video stream.

As used herein, the term "capture event" refers to an action or occurrence corresponding to the creation of an image. In particular, a capture event includes a user action at a computing device associated with generating a media item such as an image or video based on media data captured by the camera of the computing device. For example, in some embodiments, a capture event comprises a selection of a user interface element or a button.

As used herein, the term "resolution" refers to a number of pixels included in a digital media item. In particular, resolution includes the number of pixels in an image or a video. Resolutions are represented as a number of pixels by a number of pixels (e.g., 512×512) or as a single number of pixels representing the larger dimension (e.g., 2K, 4K, 8K). In instances in which resolution is represented by a single number of pixels, the number represents the larger dimension (e.g., 4096×2160=4K). For example, a digital videos or images comprise 2K, 4K, or 8K or other resolutions. As used herein, the term "high resolution" refers to resolutions greater than 2K (e.g., 4K, 8K), while "low resolution" refers to resolutions of 2K or less.

As used herein, the term "artistic-effect patch generative adversarial neural network" or "artistic-effect patch GAN" refers to a computer-implemented neural network that generates synthesized artistic images. Indeed, in some embodiments, the artistic-effect patch GAN refers to a neural network that analyzes an input image and generates a synthesized artistic image based on the analysis. More specifically, the artistic-effect patch GAN employs adversarial learning to generate high quality synthesized artistic images. In particular, the artistic-effect patch GAN includes a generator neural network (or simply "generator") that learns to generate a synthesized artistic image from an input image. The artistic-effect patch GAN also includes an adversarial discriminator neural network (or simply "discriminator") that learns to classify patches of artistic images as real or fake. For example, the discriminator classifies whether patches of a synthesized artistic image are real or fake as compared with patches of an authentic artistic image.

As used herein, the term "input image" refers to a digital graphics file that, when rendered, displays one or more objects. In particular, an input image comprises a real-world image captured by a camera. For example, an input image comprises a digital photograph. Additionally, an input image includes a frame of a video stream.

As used herein, the term "synthesized artistic image" refers to an artistic version of a digital image. In particular, a synthesized artistic image includes a digital image generated utilizing the generator of an artistic-effect patch GAN or a distilled artistic-effect neural network generator. More specifically, the generator creates the synthesized artistic image by applying an artistic-effect to an input image. For example, a synthesized artistic comprises an anime version of a photograph of an object.

As used herein, the term "loss function" refers to a function that indicates training loss. In some embodiments, a machine-learning algorithm repetitively trains to minimize total overall loss. For example, the loss function determines a partial or total amount of loss with respect to generating a synthesized artistic image when compared to an authentic artistic image (e.g., a ground truth). The loss function provides feedback, which is back propagated to one or more layers of the generator or discriminator of the artistic-effect patch GAN and/or the distilled artistic-effect neural network generator to tune/fine-tune those layers. Examples of loss functions include a cross-entropy loss function, a residual loss function, a perceptual loss function, a total variance loss function, a content loss, style loss, color loss, or blur loss, and a least squares loss function.

As used herein, the term "authentic artistic image" refers to a genuine artistic image. In particular, an authentic artistic image comprises a ground truth image of an artistic style. In one example, an authentic artistic image comprises a hand-drawn anime image, sketch, painting, or other type of artistic image.

As used herein, the term "patch" refers to an area of an image. In particular, a patch comprises an area within a larger image. Patches can be defined by a number of pixels, such as a 4×4 patch or 16×16 patch. In one example, the artistic-effect generation system 106 determines N×N patches within a synthesized artistic image and an authentic artistic image.

As used herein, the term "features" refers to characteristics or attributes of a digital image. In particular, features comprise values corresponding to latent and/or patent attributes and characteristics of an input (e.g., a digital media item) analyzed by a neural network. In some embodiments, features comprise numerical values representative of style, color, content, and other characteristics of digital images.

As used herein, the term "target artistic image" refers to an artistic image utilized in modifying parameters of a neural network. In particular, a target artistic image comprises an artistic image generated by a generator of an artistic-effect patch GAN as part of modifying parameters of the distilled artistic-effects neural network generator. For example, a target artistic image comprises an anime, sketch, or other artistic style image generated by the generator of the artistic-effect patch GAN.

As used herein, the term "learning artistic image" refers to an artistic image generated by a neural network that is in the process of being tuned. In particular, a learning artistic image comprises an artistic image generated by the distilled artistic-effect neural network generator. For example, a learning artistic image comprises an anime, sketch or other artistic style image generated by the distilled artistic-effect neural network generator.

The following disclosure provides additional detail regarding the artistic-effect generation system in relation to illustrative figures portraying example embodiments and implementations of the artistic-effect generation system. For example, FIG. 1 illustrates a schematic diagram of a system environment (or "environment") 100 in which an artistic-effect generation system 106 operates in accordance with one or more embodiments. As illustrated in FIG. 1, the environment 100 includes a server device(s) 102, a network 112, and a mobile client device 108.

While FIG. 1 shows an embodiment of the artistic-effect generation system 106, alternative embodiments and configurations are possible. For example, the environment 100 can include any number of client devices, servers, or other components in communication with the artistic-effect generation system 106 via the network 112. As another example, the server device(s) 102 can represent a set of connected server devices. As a further example, the mobile client device 108 may communicate directly with the server device(s) 102, bypassing the network 112 or utilizing a separate and/or additional network.

In some embodiments, the server device(s) 102, the network 112 and the mobile client device 108 are communicatively coupled with each other either directly or indirectly. For example, and as shown in FIG. 1, the server device(s) 102 and the mobile client device 108 are connected via the network 112. Each of the components of the environment 100 communicate via the network 112. The network 112 comprises any suitable network over which computing devices can communicate. Example networks are discussed in additional detail below in relation to FIG. 11.

As illustrated in FIG. 1, the environment 100 includes the server device(s) 102. The server device(s) 102 generate, store, receive, and transmit digital content including software hosted at the server device(s) 102, digital video, digital images, digital audio, digital designs, metadata, etc. Furthermore, in some embodiments, the server device(s) generate, store, receive and transmit neural networks. In particular, the server device(s) 102 utilizes image data to modify parameters of various neural networks including an artistic-effect patch GAN and a distilled neural network. Subsequently, the server device(s) 102 transmits the distilled neural network to the mobile client device 108 via the network 112. In some embodiments, the server device(s) 102 comprises a data server. Additionally, or alternatively, the server device(s) 102 comprises a communication server or a web-hosting server.

As further shown in FIG. 1, the server device(s) 102 includes an image capture and editing system 104. Generally, the image capture and editing system 104 facilitates the capture and modification of digital images within applications. In one example, the image capture and editing system 104 provides tools for capturing images and editing the images in real time. For example, the image capture and editing system 104 provides filters and other image manipulation tools. Moreover, the image capture and editing system 104 operates in connection with one or more applications to generate or modify images. For example, in one or more embodiments, the image capture and editing system 104 operates in connection with digital design applications such as ADOBE® PHOTOSHOP®, CAMERA, ADOBE® PHOTOSHOP®, ADOBE® ELEMENTS®, ADOBE® INDESIGN®, or other image editing applications.

As illustrated in FIG. 1, the image capture and editing system 104 includes the artistic-effect generation system 106. As described in additional detail below, the artistic-effect generation system 106 accurately and efficiently generates synthesized artistic images in real time. More specifically, the artistic-effect generation system 106 generates, modifies, and utilizes an artistic-effect patch GAN 114 and a distilled artistic-effect neural network generator 116. In some embodiments, the artistic-effect generation system 106 modifies parameters of a generator of the artistic-effect patch GAN 114 to generate temporally consistent and smooth artistic images. The artistic-effect generation system 106 further applies model distillation to the artistic-effect patch GAN 114 to generate a lighter distilled artistic-effect neural network generator 116. More specifically, the distilled artistic-effect neural network generator 116 comprises a lightweight neural network that the artistic-effect generation system 106 deploys on the mobile client device 108.

As illustrated in FIG. 1, the environment 100 includes the mobile client device 108. The mobile client device 108 generates, stores, receives, and sends digital data. For example, the mobile client device 108 communicates with the server device(s) 102 via the network 112. The mobile client device 108 illustrated in FIG. 1 comprises various types of client devices. For example, in some embodiments, the mobile client device 108 comprises mobile devices such as laptops, tablets, mobile telephones, smartphones, etc. In other embodiments, the mobile client device 108 includes non-mobile devices, such as desktops or servers, or other types of client devices. In one or more embodiments, the mobile client device 108 comprises a camera. More specifically, the mobile client device 108 receives, processes, and captures digital media data including video streams, digital images, and other types of digital media. For example, in some embodiments, the mobile client device 108 captures video streams and applies artistic-effects to the video streams in real time. Additional details with regard to the mobile client device 108 are discussed below with respect to FIG. 11.

In some embodiments, the mobile client device 108 is associated with a user of an image capture and editing program provided by the image capture and editing system 104. Generally, the mobile client device 108 receives, from the server device(s) 102 and via the network 112, data utilized in real-time image processing. For example, the mobile client device 108 receives data including neural networks, algorithms, or other systems by which to apply artistic-effects to captured video streams.

As further illustrated in FIG. 1, the mobile client device 108 includes an artistic-effect generation application 110. In some embodiments, the artistic-effect generation application 110 comprises a web application or a native application on the mobile client device 108 (e.g., a mobile application, a desktop application, etc.). As illustrated, the artistic-effect generation application 110 interfaces with the artistic-effect generation system 106 to provide digital data including graphical user interfaces, user interactions, digital images, and operations. For example, in one or more embodiments, the artistic-effect generation application 110 comprises a mobile application that renders a graphical user interface that includes features and elements for applying artistic-effects to video streams or images captured by the camera of the mobile client device 108.

As illustrated in FIG. 1, the artistic-effect generation application 110 includes a distilled artistic-effect neural network generator 116. In some embodiments, the distilled artistic-effect neural network generator 116 comprises the same structure and characteristics of the distilled artistic-effect neural network generator 116 created by the artistic-effect generation system 106. In particular, artistic-effect generation system 106 utilizes the distilled artistic-effect neural network generator 116 stored on the mobile client device 108 to generate artistic images in real time on the mobile client device 108.

Although FIG. 1 depicts the artistic-effect generation system 106 located on the server device(s) 102, in some embodiments, the artistic-effect generation system 106 is implemented by (e.g., located entirely or in part) on one or more other components of the environment 100. In one example, the artistic-effect generation system 106 is implemented entirely (or in part) on the mobile client device 108.

Additionally, in some embodiments, the mobile client device 108 communicates directly with the artistic-effect generation system 106, bypassing the network 112. Moreover, the artistic-effect generation system 106 can access one or more databases (e.g., an artistic-effect database) housed on the server device(s) 102 or elsewhere in the environment 100. In one or more embodiments, the artistic-effect generation system 106 is implemented in a variety of different ways across the server device(s) 102, the network 112, and the mobile client device 108.

As mentioned above, the artistic-effect generation system 106 employs machine learning and various neural networks in various embodiments. Machine learning refers to the process of constructing and implementing algorithms that can learn from and make predictions on data. In general, machine learning may operate by building models from example inputs, such as image exposure training pairs within a training dataset of images, to make data-driven predictions or decisions. Machine learning can include neural networks (e.g., a natural language processing neural network, a specialized object detection neural network, a concept-based object detection neural network, a known object class detection neural network, an object proposal neural network, an unknown object class detection neural network, a region proposal neural network, a concept embedding neural network, an object mask neural network, an object classification neural network, and/or a selected object attribute detection neural network), data-based models (e.g., a natural language processing model, an unknown object class detection model, an object recognition model, a filtering model, and/or a selection object attribute model), or a combination of networks and models.

FIG. 1 illustrates an example environment in which the artistic-effect generation system 106 functions in accordance with one or more embodiments. The subsequent paragraphs primarily focus on the following functions of the artistic-effect generation system 106: (i) generating an artistic image utilizing the distilled artistic-effect neural network generator, (ii) generating and modifying an artistic-effect patch GAN, and (iii) utilizing the artistic-effect patch GAN to generate and modify the distilled artistic-effect neural network generator. In particular, FIG. 2 and the corresponding discussion provide a general overview of the process the artistic-effect generation system 106 performs to generate an artistic image in accordance with one or more embodiments. In particular, FIG. 2 illustrates a series of acts 200 comprising an act 202 of capturing a video stream, an act 204 of generating a synthesized artistic video stream at a first resolution, an act 206 of receiving an indication of a capture event, and an act 208 of generating an artistic image at a second resolution.

Figure 2:
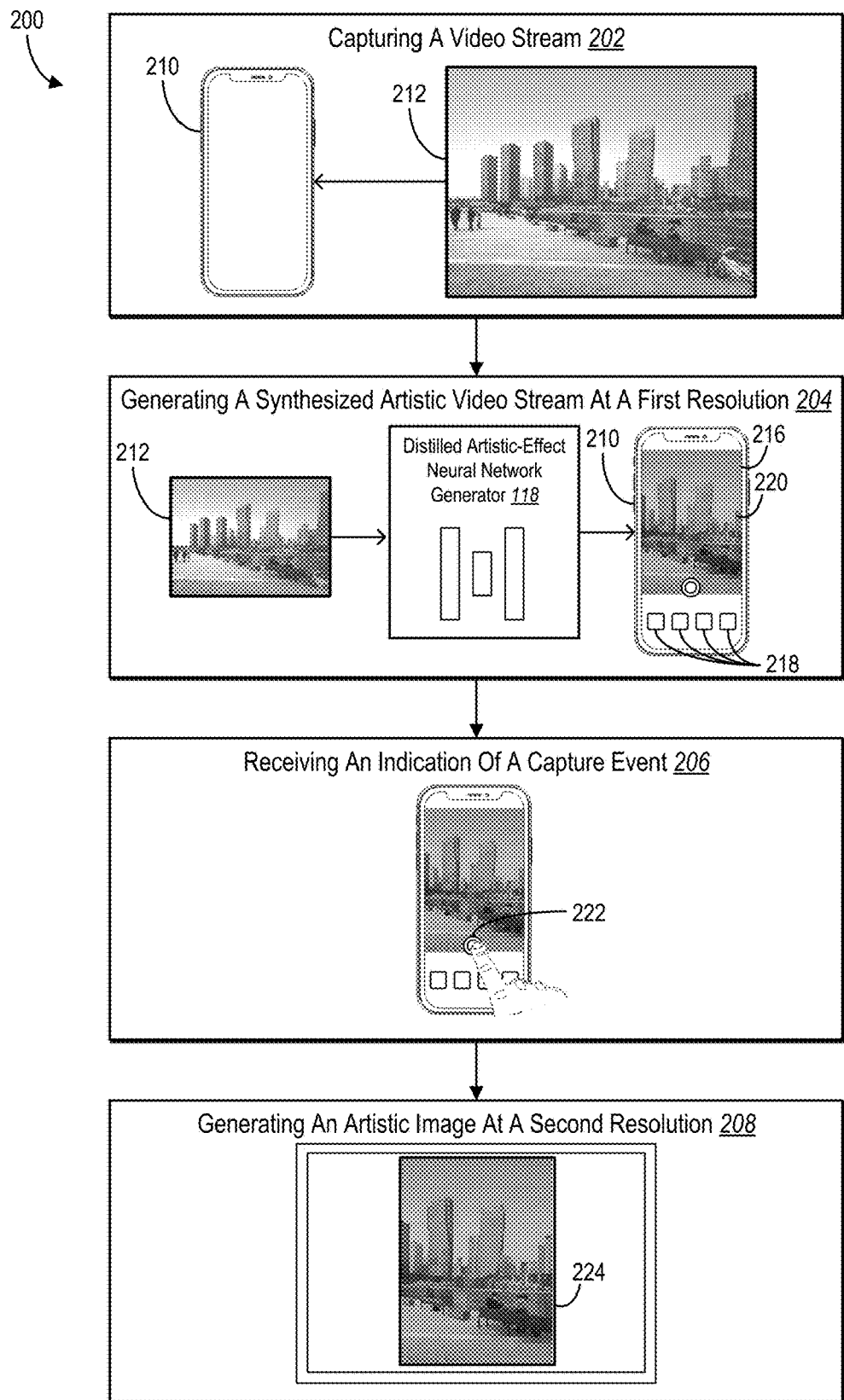
FIG. 2 illustrates an overview of a process of generating a high-resolution artistic image in accordance with one or more embodiments of the present disclosure.

As illustrated in FIG. 2, the artistic-effect generation system 106 performs the act 202 of capturing a video stream 212. Generally, the artistic-effect generation system 106 receives the video stream 212 from a camera of the mobile device 210 (e.g., the mobile client device 108). The video stream 212 comprises a plurality of frames, each comprising a still image. In some embodiments, the artistic-effect generation system 106 displays the raw video stream 212 via the screen of the mobile device 210. In one example, the artistic-effect generation system 106 begins capturing the video stream 212 based on receiving an indication that a user has selected a particular artistic-effect. More specifically, based on receiving an indication of a user selection of an anime effect via a graphical user interface of the mobile device 210, the artistic-effect generation system 106 begins capturing the video stream 212.

As illustrated in FIG. 2, the series of acts 200 includes the act 204 of generating a synthesized artistic video stream at a first resolution. In particular, as part of performing the act 204, the artistic-effect generation system 106 utilizes a distilled artistic-effect neural network generator 116 to generate a synthesized artistic video stream 220 at a first resolution by applying an artistic-effect to the plurality of frames from the video stream 212. More specifically, the viewfinder 216 includes real time video data captured by the camera of the mobile device 210. In some embodiments, the viewfinder 216 includes a real-time raw or unedited video stream. For example, the viewfinder 216 includes a video stream of objects currently in front of the camera. Additionally, the artistic-effect generation system 106 provides, via the viewfinder 216, a preview of the video stream with an applied artistic-effect. In at least one embodiment, the artistic-effect generation system 106 presents previews of various artistic-effects based on user selection of an artistic-effect from artistic-effect selection elements 218. For example, based on selection of an anime effect selection element from the artistic-effect selection elements 218, the artistic-effect generation system 106 provides the synthesized artistic video stream 220 by applying an anime effect to the plurality of frames from the video stream.

As part of the act 204, the artistic-effect generation system 106 provides the synthesized artistic video stream 220 at a first resolution. Generally, in some embodiments, the artistic-effect generation system 106 provides the synthesized artistic video stream 220 in real time by providing the artistic video stream 220 at a first resolution or low resolution. More specifically, the artistic-effect generation system 106 captures the video stream 212 at a first resolution (e.g., 2K resolution). The artistic-effect generation system 106 processes the video stream 212 at the first resolution utilizing the distilled artistic-effect neural network generator 116 to generate the synthesized artistic video stream 220 at the same resolution (e.g., 2K resolution).

The artistic-effect generation system 106 performs the act 206 of receiving an indication of a capture event. As mentioned, the capture event comprises a user action associated with generating a media item such as an image or a video. In some embodiments, and as illustrated in FIG. 2, the capture event comprises a user selection of a media capture element 222. For example, the artistic-effect generation system 106 determines to generate an artistic image based on user selection of the media capture element 222. In one or more embodiments, the artistic-effect generation system 106 receives indications of different types of capture events. For example, the artistic-effect generation system 106 receives indications of a video capture event and/or an image capture event. For instance, the artistic-effect generation system 106 receives an image capture event based on a user tap of the media capture element 222. In another example, the artistic-effect generation system 106 identifies a video capture event based on user selection of a video capture element and/or a user selecting and holding the media capture element 222.

As further illustrated in FIG. 2, the artistic-effect generation system 106 performs the act 208 of generating an artistic image at a second resolution. In particular, based on an indication of the capture event, the artistic-effect generation system 106 generates an artistic image comprising a frame from the synthesized artistic video stream 220 with the artistic-effect at a second resolution or high resolution that is higher than the first resolution. In contrast to the synthesized artistic video stream 220, that the artistic-effect generation system 106 at a first resolution, the artistic-effect generation system 106 generates a higher resolution artistic image 224. In particular, the artistic-effect generation system 106 utilizes upsampling within the distilled artistic-effect neural network generator 116 to generate the artistic image 224 at the second resolution. In one or more embodiments, the second resolution is 4K. For example, in some embodiments, the artistic image 224 comprises an image at twice the resolution than any individual frame within the synthesized artistic video stream 220.

In addition to generating artistic images at higher resolutions, the artistic-effect generation system 106 also generates artistic videos at higher resolutions. In particular, an artistic video comprises a video comprising frames to which the artistic-effect generation system 106 has applied the artistic-effect. For example, in some embodiments, the artistic-effect generation system 106 generates an artistic video comprising artistic frames at 4K resolution.

As mentioned, as part of generating the distilled artistic-effect neural network generator 116, the artistic-effect generation system 106 generates and learns parameters for a generator of an artistic-effect patch generative adversarial neural network. The following figures and corresponding paragraphs provide additional detail regarding the generator of the artistic-effect patch GAN. In particular, FIG. 3 illustrates an overview diagram 300 of the artistic-effect generation system 106 utilizing a generator of an artistic-effect patch generative adversarial neural network to create a synthesized artistic image, and FIG. 4 illustrates the artistic-effect generation system 106 learning parameters for the artistic-effect patch generative adversarial neural network generator 304 in accordance with one or more embodiments.

Figure 3:
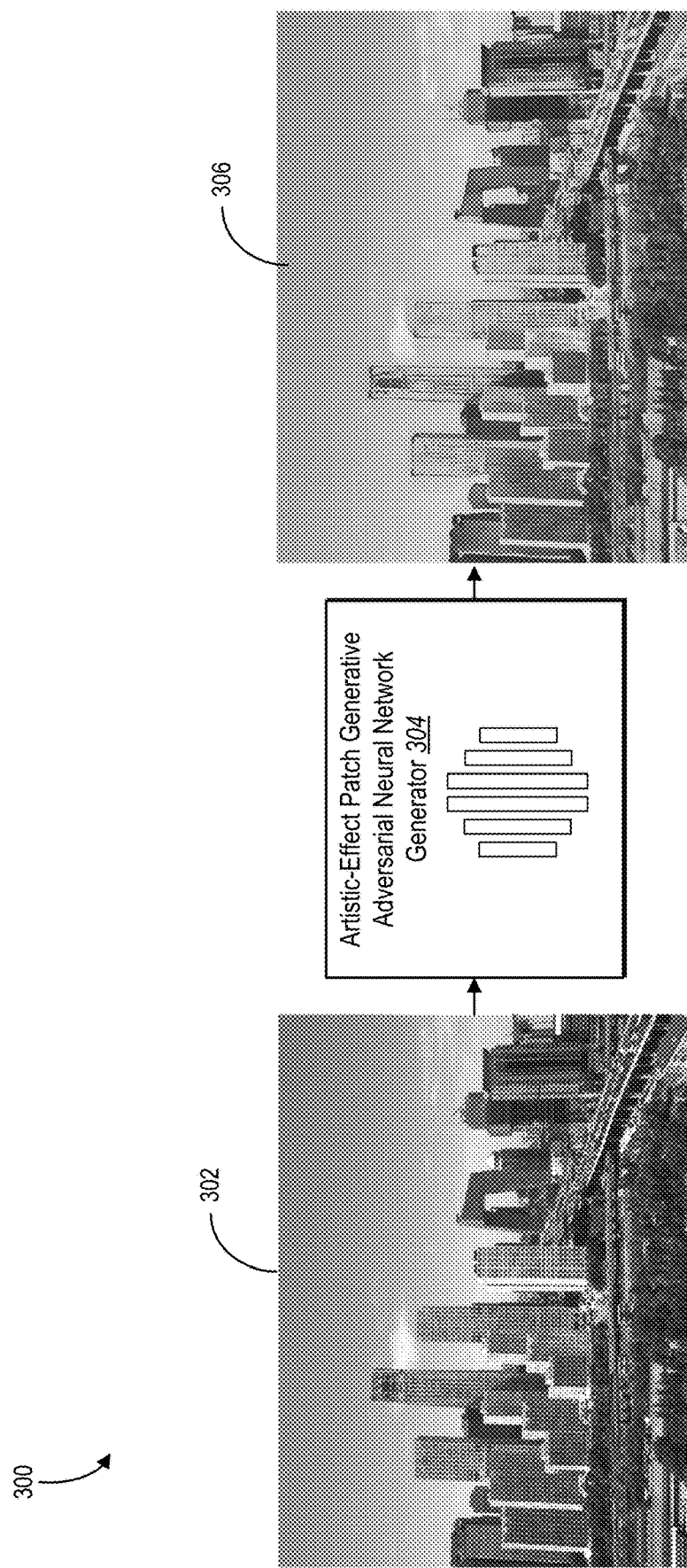
FIG. 3 illustrates an overview diagram of an artistic-effect patch generative adversarial neural network generator generating an artistic image from a real-world image in accordance with one or more embodiments of the present disclosure.
Figure 4:
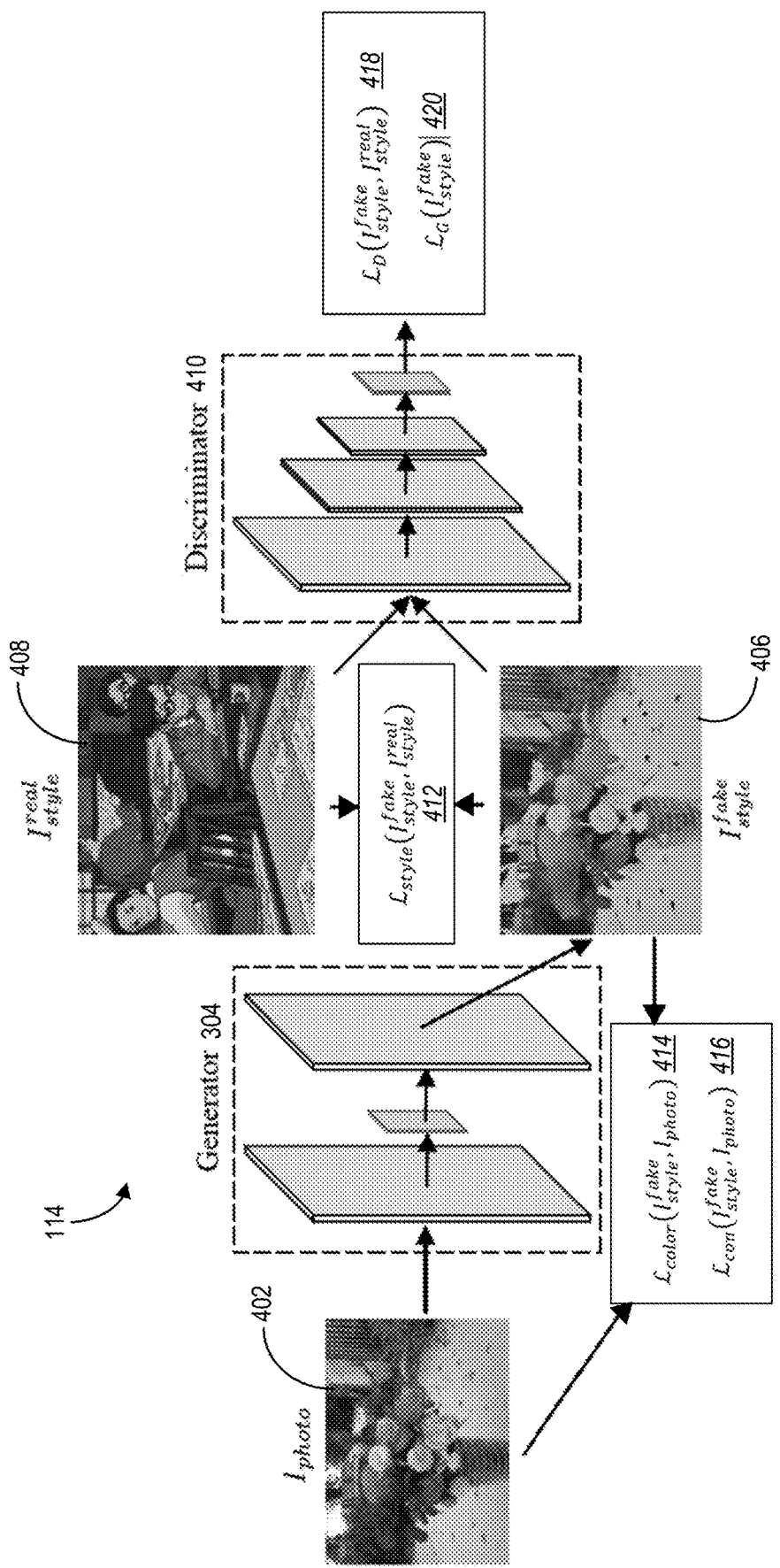
FIG. 4 illustrates a diagram of a process for modifying parameters of a generator of an artistic-effect patch generative adversarial neural network in accordance with one or more embodiments of the present disclosure.

FIG. 3 illustrates the artistic-effect generation system 106 utilizing an artistic-effect patch generative adversarial neural network generator 304 to create a synthesized artistic image 306 from an input image 302 in accordance with one or more embodiments. For example, the artistic-effect generation system 106 processes the input image (i.e., a digital photograph) utilizing the artistic-effect patch generative adversarial neural network generator 304. In particular, the artistic-effect generation system 106 deploys the artistic-effect patch generative adversarial neural network generator 304 to create a high quality synthesized artistic image. As illustrated in FIG. 3, the artistic-effect patch generative adversarial neural network generator 304 creates the synthesized artistic image 306. More specifically, the synthesized artistic image 306 comprises a stylized version of the input image 302. In one example, the artistic-effect generation system 106 deploys the artistic-effect patch generative adversarial neural network generator 304 on a server device. Furthermore, in one or more embodiments, the artistic-effect generation system 106 utilizes the artistic-effect patch generative adversarial neural network generator 304 to create artistic videos of input videos.

In one or more embodiments, the artistic-effect patch generative adversarial neural network generator 304 comprises an encoder-decoder architecture. For example, the artistic-effect patch generative adversarial neural network generator 304 comprises a convolution-BatchNorm-ReLu architecture. Still further, in one or more embodiments, the artistic-effect patch generative adversarial neural network generator 304 comprises a U-net based architecture (e.g., an encoder-decoder with skip connections between mirrored layers in the encoder and decoder stacks). For example, in one or more embodiments, the patch generative adversarial neural network generator 304 comprises a U-net architecture with a contrasting path and an expansive path. The contracting path comprises repeated blocks of two 3×3 convolutions (unpadded convolutions), each followed by a rectified linear unit (ReLU) and a 2×2 max pooling operation with stride 2 for downsampling. The artistic-effect patch generative adversarial neural network generator 304 doubles the number of feature channels at each downsampling step. The expansive path comprises upsampling of the feature map at each step followed by a 2×2 convolution (i.e., an up-convolution) that halves the number of features channels, a concatenation with the correspondingly cropped feature map from the contracting path, and two 3×3 convolutions, which are each followed by a ReLU.

As previously mentioned, the artistic-effect generation system 106 learns parameters for the artistic-effect patch generative adversarial neural network generator 304 of the artistic-effect patch GAN 114. FIG. 4 and the corresponding discussion detail the artistic-effect generation system 106 modifying parameters of the generator 304 utilizing a discriminator of the artistic-effect patch GAN 114 with additional constraints in accordance with one or more embodiments. In particular, as illustrated in FIG. 4, the artistic-effect generation system 106 generates, utilizing a generator 304, a synthesized artistic image 406 from an input image 402. Generally, the artistic-effect generation system 106 utilizes a discriminator 410 to compare the synthesized artistic image 406 with an authentic artistic image 408 to generate a discriminator loss 418 and a generator loss 420. Additionally, the artistic-effect generation system 106 further tunes parameters of the generator 304 by applying various losses based on comparing features between the synthesized artistic image 406, the input image 402, and the authentic artistic image 408. The following paragraphs provide additional detail with respect to the artistic-effect generation system 106 modifying parameters of the generator 304 and the discriminator 410 based on various losses.

As part of modifying parameters of the generator 304, the artistic-effect generation system 106 accesses and prepares two datasets of images. In particular, the artistic-effect generation system 106 creates a dataset comprising real-world input images and a second dataset comprising authentic artistic images. In one example, the real-world input images comprise photographs depicting objects. The artistic-effect generation system 106 accesses the dataset of real-world input images to identify the input image 402.

Additionally, the artistic-effect generation system 106 prepares a second dataset comprising authentic artistic images. In particular, the authentic artistic images comprise artistic images in a particular artistic style. In one example, the dataset of authentic artistic images comprises anime images. In other embodiments, the dataset of authentic artistic images comprises images with other artistic styles such as sketches, paintings, cartoons, or others. In some embodiments, the authentic artistic images are not paired with the real-world input images. For example, and as illustrated in FIG. 4, the artistic-effect generation system 106 retrieves the authentic artistic image 408 depicting several anime characters in contrast with the flowers in the input image 402.

As illustrated in FIG. 4, the artistic-effect generation system 106 utilizes the generator 304 to generate the synthesized artistic image 406 from the input image 402. In particular, the artistic-effect generation system 106 utilizes the generator 304 to apply an artistic-effect to the input image 402. In particular, the artistic-effect generation system 106 utilizes the generator 304 to generate the synthesized artistic image 406 that maintains the contents of the input image 402. For example, the synthesized artistic image 406 depicts the same flowers as in the input image 402 but in an anime style. For example, the artistic-effect generation system 106 utilizes the generator 304 to apply an anime effect to the input image 402. In other examples, the artistic-effect generation system 106 utilizes the generator 304 to apply various other artistic-effects to the input image 402.

As further illustrated in FIG. 4, the artistic-effect generation system 106 utilizes the discriminator 410 of the artistic-effect patch GAN to generate classifications of patches of the synthesized artistic image 406 as real or fake as compared with patches of the authentic artistic image 408. More specifically, instead of distinguishing whether the synthesized artistic image 406 is fake based on the entire synthesized artistic image 406, the artistic-effect generation system 106 utilizes the discriminator 410 to penalize the structure of the synthesized artistic image 406 at the scale of image patches. More specifically, the artistic-effect generation system 106 utilizes the discriminator 410 to generate a classification for each N size patch of the synthesized artistic image 406. Each classification indicates whether the corresponding patch is real or fake as compared to patches from the authentic artistic image 408. In some embodiments, the discriminator 410 output comprises a 2D logit map with a spatial size of M×M, each logit node in the logit map focuses on an N×N patch of the synthesized artistic image 406.

The artistic-effect generation system 106 utilizes the generated classifications to determine a generator loss 420. Generally, to optimize the generator loss 420, the generator 304 is encouraged to generate synthesized artistic images that have features similar to authentic artistic images to "fool" the discriminator 410. In some embodiments, the generator loss 420 takes the form of Least-Square GAN (LSGAN) to ensure a stable training. More specifically, in one or more embodiments, the artistic-effect generation system 106 employs the LSGAN loss.

Specifically, in one or more embodiments, the following equation represents the generator loss ($L_G$) 420 determined by the artistic-effect generation system 106:

$$L_G = \frac{1}{2} \mathbb{F}_{I \sim P_{photo}} \Sigma_H \Sigma_W [(D(G(I)) - c)^2]$$

In the above equation, $P_{photo}$ denotes the distribution of input images. $D_i^j(\bullet)$ and $G(\bullet)$ stand for the output of the discriminator 410 and the output of the generator 304 respectively given the input image (I). H and W represent the height and width of the logit map output by the discriminator 410, while c denotes the value that the generator 304 wants the discriminator 410 to believe for fake data.

The artistic-effect generation system 106 also utilizes the generated classifications to determine a discriminator loss 418. To optimize the discriminator loss 418, the discriminator 410 is encouraged to generate more accurate classifications of patches of the synthesized artistic image 406. Similar to the generator loss 420, in some embodiments, the discriminator loss 418 takes the form of LSGAN to ensure a stable training.

In one or more embodiments, the following equation represents the discriminator loss ($L_D$) 418 determined by the artistic-effect generation system 106:

$$L_D = \frac{1}{2} \mathbb{F}_{I \sim P_{style}} \Sigma_H \Sigma_W [(D(I) - a)^2] + \frac{1}{2} \mathbb{F}_{I \sim P_{photo}} \Sigma_H \Sigma_W [(D(G(I)) - b)^2]$$

In the above equation, $P_{style}$ and $P_{photo}$ denote the distribution of authentic images and input images, respectively. $D_i^j(\bullet)$ and $G(\bullet)$ stand for the output of the discriminator 410 and the output of the generator 304 respectively given the input image (I). H and W represent the height and width of the logit map output by the discriminator 410, while a and b represent the classifications for fake patches and real patches, respectively, and c denotes the value that the generator 304 wants the discriminator 410 to believe for fake data.

In addition to the discriminator loss 418 and the generator loss 420 introduced above, the artistic-effect generation system 106 introduces additional constraints to the generator 304 and the discriminator 410 to improve the quality of synthesized artistic images. For example, the artistic-effect generation system 106 introduces various constraints to encourage the generator 304 to create more accurate synthesized artistic images. As further illustrated in FIG. 4, the artistic-effect generation system 106 further modifies parameters of the generator 304 using a color loss ($L_{color}$) 414, a content loss ($L_{con}$) 416, and a style loss ($L_{style}$) 412. The following paragraphs provide additional detail regarding each of these losses.

As illustrated in FIG. 4, the artistic-effect generation system 106 determines the color loss 414 and the content loss 416 based on comparing features of the input image 402 and the synthesized artistic image 406. Generally, the artistic-effect generation system 106 extracts features from the synthesized artistic image 406 and also features from the input image 402. The artistic-effect generation system 106 generates a comparison between the features of the synthesized artistic image 406 and the features of the input image 402.

As mentioned, the artistic-effect generation system 106 applies the color loss 414 to the generator 304 of the artistic-effect patch GAN. Generally, the artistic-effect generation system 106 applies the color loss 414 to encourage the generator 304 to generate synthesized artistic images with colors consistent with the input images. In particular, the artistic-effect generation system 106 encodes the synthesized artistic image 406 and the input image 402 into a YUV color space. The artistic-effect generation system 106 then generates a comparison between the color features of the synthesized artistic image 406 and the input image 402 by generating a color loss that compares the features in the YUV color space. In at least one embodiment, the artistic-effect generation system 106 compares the L1 loss between color features of the synthesized artistic image 406 and the input image 402. For example, in some embodiments, the artistic-effect generation system 106 determines the color loss 414 in the following form:

$$L_{color} = \mathbb{E}_{I \sim P_{photo}}[\|Y(G(I)) - Y(I)\|_1 + \|U(G(I)) - U(I)\|_1 + \|V(G(I)) - V(I)\|_1]$$

The artistic-effect generation system 106 encourages the generator 304 to create synthesized artistic images that are consistent in content with input images. More specifically, in order to ensure that the content of the synthesized artistic image 406 is consistent with the content of the input image 402, the artistic-effect generation system 106 applies the content loss 416 to the generator 304. In particular, the artistic-effect generation system 106 extracts feature maps from the synthesized artistic image 406 and the input image 402 by utilizing a convolutional neural network. In one example, the artistic-effect generation system 106 applies the content loss 416 comprising an L1 norm of the difference of the feature maps from the synthesized artistic image 406 and the input image 402. In some embodiments, the artistic-effect generation system 106 deploys a VGG neural network to extract feature maps. For example, in one or more embodiments, the artistic-effect generation system 106 obtains the feature maps for the synthesized artistic image 406 and the input image 402 from the fourth layer of a VGG-19 neural network. An example VGG is described in K. Simonyan & A. Zisserman, "Very Deep Convolutional Networks for Large-Scale Image Recognition," arXiv:1409:1556 (4 Sep. 2014), the entire contents of which are hereby incorporated by reference.

In one or more embodiments, the artistic-effect generation system 106 generates the content loss ($L_{con}$) 416 in the following form:

$$L_{con} = \mathbb{E}_{I \sim P_{photo}}[\|VGG(G(I)) - VGG(I)\|_1]$$

In the above equation, VGG(•) denotes the feature map output obtained using the VGG. More specifically VGG(G(I)) represents the feature map corresponding with the synthesized artistic image 406, and VGG(I) denotes the feature map output corresponding with the input image 402.

Furthermore, and as illustrated in FIG. 4, the artistic-effect generation system 106 back propagates the style loss 412 to the generator 304. Generally, the artistic-effect generation system 106 utilizes the style loss 412 to accelerate the learning of textures of authentic artistic images. In particular, the artistic-effect generation system 106 generates an authentic artistic image gram matrix based on authentic artistic image 408 and a synthesized artistic image gram matrix based on deep features of the synthesized artistic image 406. The artistic-effect generation system 106 generates a comparison between the features of the synthesized artistic image 406 and the features of the authentic artistic image 408 by generating the style loss 412 that compares the authentic artistic image gram matrix and the synthesized artistic image gram matrix. In at least one embodiment, the artistic-effect generation system 106 generates the gram matrices and calculates the style loss 412 by the method described in L. Gatys, et. al., "Texture Synthesis Using Convolutional Neural Networks," arXiv:1505.07376v3 (6 Nov. 2015), the entire contents of which are hereby incorporated by reference.

More specifically, in one or more embodiments, the artistic-effect generation system 106 utilizes the VGG neural network described above to extract deep features from the synthesized artistic image 406 and the authentic artistic image 408. In one or more embodiments, the artistic-effect generation system 106 generates the style loss ($L_{style}$) 412 in the following form:

$$L_{style} = \mathbb{E}_{I \sim P_{photo}, I \sim P_{style}}[\|VGG(G(I))^T VGG(G(I)) - VGG(G(I))^T VGG(G(I))\|_1]$$

Furthermore, and as mentioned previously, the artistic-effect generation system 106 applies additional constraints to the discriminator 410. Generally, GANs often fail to retrieve edge information and thus generate blurred images. In order to encourage the generator 304 to output images with sharper edges, the artistic-effect generation system 106 applies a blur loss to the discriminator 410. For instance, by introducing a blur loss to the discriminator 410, the artistic-effect generation system 106 utilizes the discriminator 410 to penalize blurred synthesized artistic images, thus forcing the generator 304 to output synthesized artistic images with sharper edges.

To generate the blur loss, the artistic-effect generation system 106 generates sample blurred artistic images. For example, in one or more embodiments, the artistic-effect generation system 106 applies Gaussian filters to authentic artistic images. The artistic-effect generation system 106 feeds patches of the sample blurred artistic images into the discriminator 410 as fake samples. In some embodiments, the artistic-effect generation system 106 determines the blur loss in the following form:

$$L_{blur} = \frac{1}{2} \mathbb{E}_{I \sim P_{blur}} \Sigma_H \Sigma_W (D(I) - c)^2$$

In the above equation, $P_{blur}$ denotes the distribution of the sample blurred artistic images.

In summary, in addition to applying the generator loss 420 ($L_G$), the artistic-effect generation system 106 applies additional constraints in the form of the content loss ($L_{con}$) 416, the style loss ($L_{style}$) 412, and the color loss ($L_{color}$) 414 to the generator 304. In particular, the final form of the loss applied to the generator 304 is as follows:

$$L_{generator} = L_G + L_{con} + L_{style} + L_{color}$$

Furthermore, in addition to applying the discriminator loss ($L_D$) 418, the artistic-effect generation system 106 applies an additional constraint in the form of a blur loss ($L_{blur}$) to the discriminator 410. In particular, the final form of the loss applied to the discriminator 410, is as follows:

$$L_{discriminator} = L_D + L_{blur}$$

Thus, the artistic-effect generation system 106 tunes parameters tunes or learns the parameters of the generator 304 (i.e., the artistic-effect patch generative adversarial neural network generator 304) by back propagating the generator loss to generator 304. Similarly, the artistic-effect generation system 106 tunes parameters of the discriminator 410 by back propagating the discriminator loss to discriminator 304.

Figure 5:
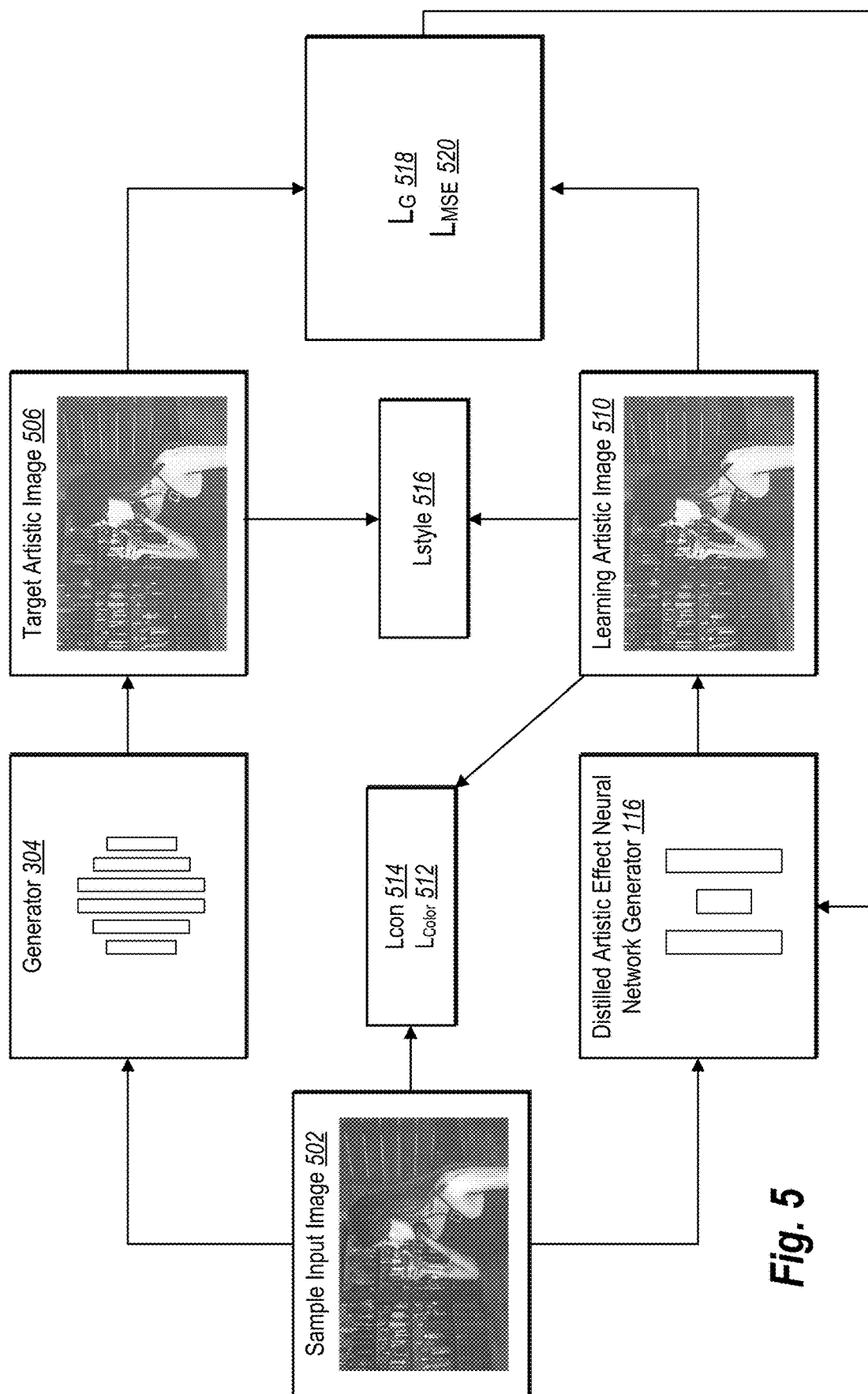
FIG. 5 illustrates a diagram of a process for modifying parameters of a distilled artistic-effect neural network generator in accordance with one or more embodiments of the present disclosure.

While the artistic-effect generation system 106 tunes parameters of the generator 304 of the artistic-effect patch GAN to create accurate synthesized artistic images, the generator 304 comprises a large neural network. The artistic-effect generation system 106 utilizes the larger generator 304 to create and tune parameters for a lighter weight distilled artistic-effect neural network generator that is better suited to be deployed on mobile devices. FIG. 5 illustrates the artistic-effect generation system 106 modifying parameters of a distilled artistic-effect neural network generator in accordance with one or more embodiments. Generally, FIG. 5 illustrates the artistic-effect generation system 106 employing a model distillation technique to obtain a lighter distilled artistic-effect neural network generator 116 (e.g., the distilled artistic-effect neural network generator 116 and/or the distilled artistic-effect neural network generator 116) that the artistic-effect generation system 106 can deploy on mobile devices in real time.

As an overview, FIG. 5 illustrates the artistic-effect generation system 106 utilizing a generator 304 of the artistic-effect patch GAN 114 to create a target artistic image 506 from a sample input image 502. The artistic-effect generation system 106 also utilizes a distilled artistic-effect neural network generator 116 to create a learning artistic image 510 from the sample input image 502. Similar to how the artistic-effect generation system 106 modifies parameters of the generator 304 by utilizing various losses and constraints, the artistic-effect generation system 106 modifies parameters of the distilled artistic-effect neural network generator 116 by applying various losses and constraints to improve the quality of output artistic images. More specifically, the artistic-effect generation system 106 determines and applies a generator loss ($L_G$) 518 and a mean square error (MSE) loss ($L_{MSE}$) 520 based on comparing the target artistic image 506 with the learning artistic image 510. Additionally, the artistic-effect generation system 106 determines and applies a content loss ($L_{con}$) 512, a color loss ($L_{color}$) 514, and a style loss ($L_{style}$) 516 based on comparing features of the sample input image 502, the target artistic image 506, and the learning artistic image 510.

As illustrated in FIG. 5, the artistic-effect generation system 106 processes the sample input image 502 utilizing the generator 304 and the distilled artistic-effect neural network generator 116. The sample input image 502 comprises a training real-world image. For example, in some embodiments, the sample input image 502 comprises a photograph.

As illustrated in FIG. 5, the artistic-effect generation system 106 utilizes the generator 304 of the artistic-effect patch GAN to create the target artistic image 506 of the sample input image 502. In particular, the generator 304 comprises a generator of an artistic-effect patch GAN which the artistic-effect generation system 106 tuned utilizing the processes described above regarding FIG. 4. Thus, the artistic-effect generation system 106 applies an artistic-effect to the sample input image 502 to create the target artistic image 506.

Furthermore, the artistic-effect generation system 106 utilizes the distilled artistic-effect neural network generator 116 to create the learning artistic image 510. As illustrated in FIG. 5, the artistic-effect generation system 106 employs a distillation technique that compresses the generator 304 to yield a significantly smaller distilled artistic-effect neural network generator. For example, while conventional systems often rely on models that have at least 1.5M parameters, in some embodiments, the distilled artistic-effect neural network generator 116 is reduced to a size of 0.02M.

As illustrated in FIG. 5, the artistic-effect generation system 106 generates a comparison between the target artistic image 506 and the learning artistic image 510. In particular, the artistic-effect generation system 106 generates the MSE loss 520 between the target artistic image 506 and the learning artistic image 510. More specifically, in one or more embodiments, the artistic-effect generation system 106 modifies parameters of the distilled artistic-effect neural network generator 116 to minimize the MSE loss 520 between the logit output of the generator 304 and the distilled artistic-effect neural network generator 116.

As mentioned previously, the artistic-effect generation system 106 further improves image quality of artistic images generated by the distilled artistic-effect neural network generator 116 by incorporating the constraints utilized in the joint loss training of the generator 304 (i.e., the artistic-effect patch generative adversarial neural network generator 304). In particular, and as illustrated in FIG. 5, the artistic-effect generation system 106 incorporates the content loss 512, the color loss 514, and the style loss 516 based on comparing features of the sample input image 502, the target artistic image 506, and the learning artistic image 510.

As illustrated in FIG. 5, the artistic-effect generation system 106 generates the content loss 512 and the color loss 514 by comparing features of the learning artistic image 510 and the sample input image 502. In particular, the artistic-effect generation system 106 extracts features from learning artistic image 510 and the sample input image 502. In one example, the artistic-effect generation system 106 utilizes the VGG neural network described previously to extract content features from the learning artistic image 510 and the sample input image 502. The artistic-effect generation system 106 generates a comparison between the features of the learning artistic image and the features of the sample input image 502 by generating a content loss that compares feature maps between the learning artistic image 510 and the sample input image 502.

Additionally, the artistic-effect generation system 106 generates the color loss 514. In one or more embodiments, the artistic-effect generation system 106 computes the L1 loss between the learning artistic image 510 and the sample input image 502 in a YUV color space. Thus, the artistic-effect generation system 106 generates a comparison between features of the learning artistic image 510 and the features of the sample input image 502 by generating the color loss 514 that compares color features between the sample input image 502 and the learning artistic image 510.

Furthermore, and as illustrated in FIG. 5, the artistic-effect generation system 106 incorporates the style loss 516. In particular, the artistic-effect generation system 106 generates the style loss 516 that compares textures between the target artistic image 506 and the learning artistic image 510. In one or more embodiments, the artistic-effect generation system 106 generates a target artistic image gram matrix based on deep features of the target artistic image 506 and a learning artistic gram matrix based on deep features of the learning artistic image 510. The artistic-effect generation system 106 generates a comparison by generating the style loss 516, which compares the target artistic image gram matrix and the learning artistic image gram matrix.

In sum, the artistic-effect generation system 106 modifies parameters of the distilled artistic-effect neural network generator 116 based on various constraints. For example, in one embodiment, the artistic-effect generation system 106 determines a joint loss for the distilled artistic-effect neural network generator 116 by combining the content loss 512, the color loss 514, the style loss 516, the MSE loss 520, and the generator loss 518 used to tune the generator 304. More specifically, in at least one embodiment, the generator loss 518 comprises the generator loss 420 discussed with respect to FIG. 4. In at least one embodiment, the artistic-effect generation system 106 determines the joint loss for the distilled artistic-effect neural network generator 116 in the following form:

$$L_{distilled\ generator} = L_G + L_{con} + L_{style} + L_{color} + L_{MSE}$$

The artistic-effect generation system 106 back propagates the distilled generator loss to update the parameters of the distilled artistic-effect neural network generator 116. Thus, the artistic-effect generation system 106 generates the distilled artistic-effect neural network generator 116 by distilling the artistic-effect patch generative adversarial neural network generator 304. In so doing, the artistic-effect generation system 106 tunes the distilled artistic-effect neural network generator 116 to learn the final logit output of the artistic-effect patch generative adversarial neural network generator 304 by optimizing the MSE loss. Furthermore, to further improve artistic images/video generated by the distilled artistic-effect neural network generator 116 and mitigate a blurry issue common to the MSE loss, the artistic-effect generation system 106 incorporates the content constraint, color constraint, and style constraint.

Once trained, the distilled artistic-effect neural network generator 116 is able to generate high quality artistic images/video while having a lightweight nature that allows for deployment on mobile devices as described below in reference to FIG. 6A. More particularly, in one or more embodiments, the distilled artistic-effect neural network generator 116 comprises 0.02 million parameters. Current state of the art systems have at least 1.4 million parameters. For example, the state of the art system disclosed by X. Wang and J. Yu in "Learning to cartoonize using white-box cartoon representations," in 2020 IEEE/CVF Conference on Computer Vision and Pattern Recognition, CVPR 2020, Seattle, WA, USA, Jun. 13-19, 2020, pp. 8087-8096, IEEE, 2020 comprises 1.48 million parameters. Other conventional system require even more parameters. For example, the system disclosed by Y. Chen, Y. Lai, and Y. Liu in "Cartoongan: Generative adversarial networks for photo cartoonization," in 2018 IEEE Conference on Computer Vision and Pattern Recognition, CVPR 2018, Salt Lake City, UT, USA, Jun. 18-22, 2018, pp. 9465-9474, IEEE Computer Society, 2018, comprises 11.38 million parameters. Thus, the distilled artistic-effect neural network generator 116 provides great gains in efficiency, computational time, and computational resources needed to generate artistic images.

Figure 6A:
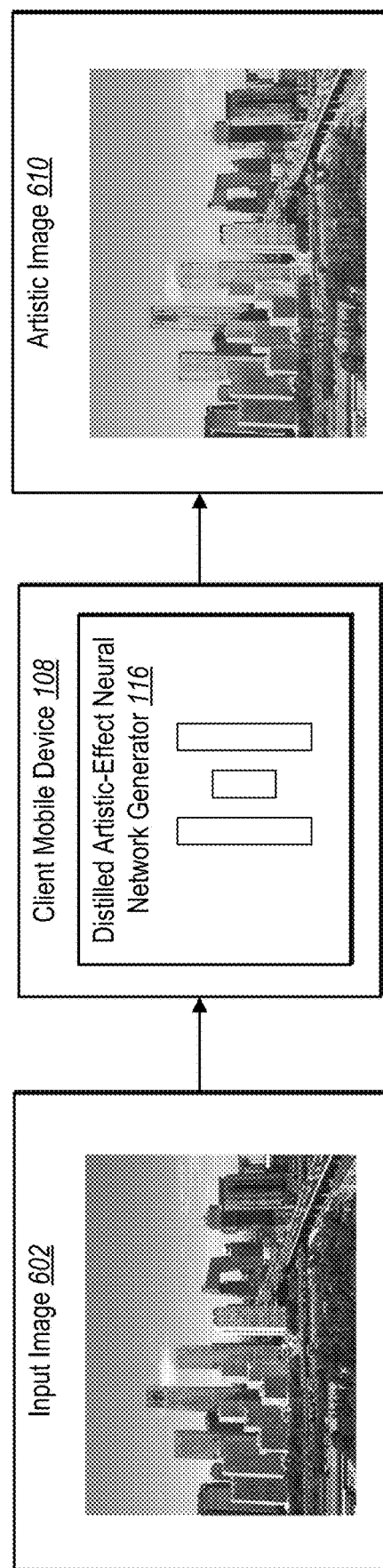
FIG. 6A illustrates the distilled artistic-effect neural network generator creating an artistic image in accordance with one or more embodiments of the present disclosure.
Figure 6B:
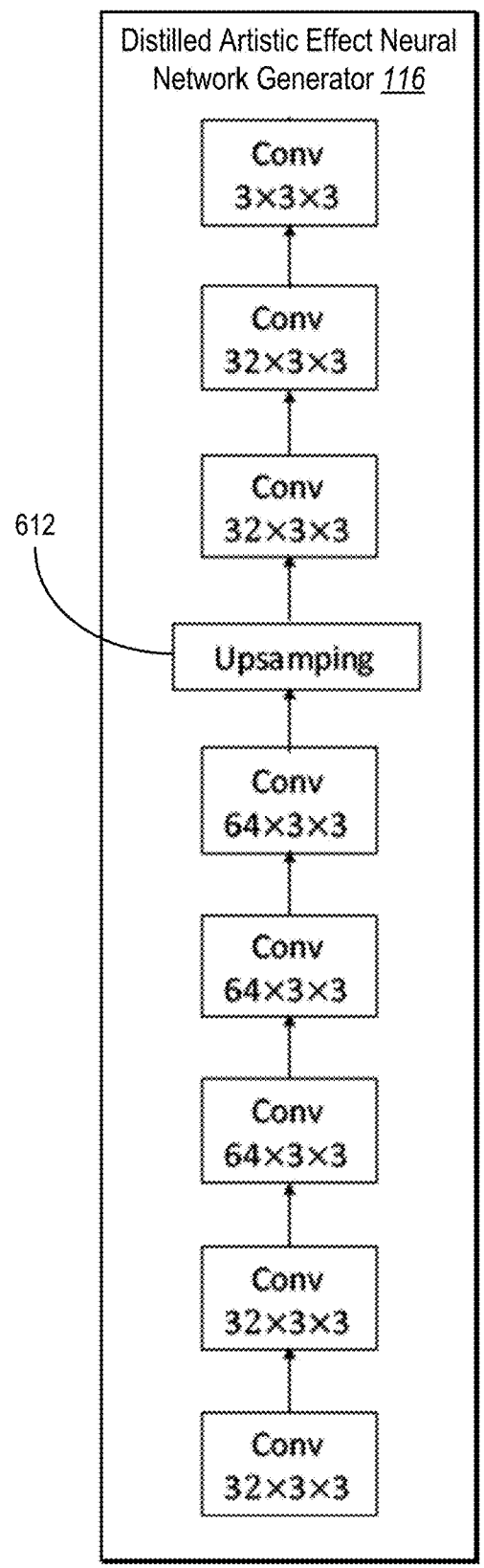
FIG. 6B illustrates a schematic diagram of the distilled artistic-effect neural network generator in accordance with one or more embodiments of the present disclosure.

FIGS. 6A-6B illustrate the artistic-effect generation system 106 utilizing the tuned distilled artistic-effect neural network generator 116 in accordance with one or more embodiments. In particular, FIG. 6A illustrates the artistic-effect generation system 106 utilizing a distilled artistic-effect neural network generator to create an artistic image, and FIG. 6B illustrates an example model architecture of the distilled artistic-effect neural network generator 116 in accordance with one or more embodiments.

FIG. 6A illustrates the artistic-effect generation system 106 processing an input image 602 utilizing a distilled artistic-effect neural network generator 116 located on a client mobile device 108. The artistic-effect generation system 106 utilizes the distilled artistic-effect neural network generator 116 to create an artistic image 610.

The input image 602 comprises a real-world image. In particular, the input image 602 comprises an image captured by a camera of the client mobile device 108. In some embodiments, the input image 602 comprises a frame of a plurality of frames of a video stream. For example, the artistic-effect generation system 106 utilizes the camera of the client mobile device 108 to capture a video stream comprising a plurality of frames. The artistic-effect generation system 106 utilizes a frame of the plurality of frames as the input image 602.

As mentioned previously, the distilled artistic-effect neural network generator 116 comprises a lightweight neural network that operates efficiently and accurately on the client mobile device 108. Additionally, and as illustrated in FIG. 6A, the artistic-effect generation system 106 utilizes the distilled artistic-effect neural network generator 116 to generate the artistic image 610. More specifically the distilled artistic-effect neural network generator 116 applies an artistic-effect to the input image 602 to generate the artistic image 610.

Additionally, the artistic-effect generation system 106 optionally generates the artistic image 610 at different resolutions. More specifically, the artistic-effect generation system 106 generates the artistic image 610 as part of a synthesized artistic video stream at a first resolution. For example, the artistic-effect generation system 106 generates the artistic image 610 at a first resolution when providing a preview of an applied artistic-effect and before receiving an indication of a capture event. In some embodiments, the artistic-effect generation system 106 receives an indication of a user selection of an artistic-effect selection element (e.g., the artistic-effect selection element 218). Based on the user selection, the artistic-effect generation system 106 utilizes the corresponding distilled artistic-effect neural network generator to generate a synthesized artistic video stream by applying an artistic-effect to the plurality of frames from the video stream. More specifically, the artistic image 610 comprises an artistic frame of the synthesized artistic video stream. In some embodiments, the artistic-effect generation system 106 generates the artistic image 610 in the first resolution in real time. In one example, the artistic-effect generation system 106 generates a synthesized artistic video stream at a 2K resolution and provides the synthesized artistic video stream for display via the client mobile device 108.

Based on an indication of a capture event, the artistic-effect generation system 106 generates the artistic image 610 at a second and higher resolution. In some embodiments, the artistic image 610 comprises a standalone high-resolution digital image. Additionally, or alternatively, the artistic image 610 comprises an artistic frame that is part of an artistic video. In one example, the artistic image 610 comprises an artistic frame in a 4K artistic video.

FIG. 6B provides an example model architecture of the distilled artistic-effect neural network generator 116 in accordance with one or more embodiments. As shown in FIG. 6B, the distilled artistic-effect neural network generator 116 consists of eight layers of convolutional blocks. The first and last convolutional blocks use a normal convolution to ensure the quality of encoded and decoded features. To deploy the distilled artistic-effect neural network generator 116 on mobile devices—even those with limited memory and processing power—the artistic-effect generation system 106 limits the size of convolutional blocks. For example, the artistic-effect generation system 106 adopts efficient separable convolutions for all of the convolutional blocks beside the upsampling block 612. Additionally, in one or more embodiments, the convolutional blocks each comprise one depthwise convolution and one pointwise convolution.

As further shown in FIG. 6B, the distilled artistic-effect neural network generator 116 includes a single upsampling block 612. Generally, the artistic-effect generation system 106 utilizes the upsampling block 612 to improve the runtime speed of the distilled artistic-effect neural network generator 116 while also ensuring the quality of the output artistic image. In particular, the upsampling block 612 enables the artistic-effect generation system 106 to extract features from a low-resolution input space which thereby entails low computational loads. For example, by integrating the upsampling block 612, the artistic-effect generation system 106 can generate higher resolution artistic images from lower resolution (e.g., 2K) input video streams. In some embodiments, the artistic-effect generation system 106 utilizes a bilinear interpolation for the upsampling block 612.

As mentioned previously, artistic-effect generation system 106 utilizes the distilled artistic-effect neural network generator 116 to generate artistic images at different resolutions. In particular, the artistic-effect generation system 106 utilizes the distilled artistic-effect neural network generator 116 to generate artistic images at a first resolution and a higher second resolution. In one or more embodiments, the artistic-effect generation system 106 dynamically adjusts the model architecture of the distilled artistic-effect neural network generator 116 to yield artistic images at different resolutions. More specifically, the artistic-effect generation system 106 utilizes the upsampling block 612 to produce higher-resolution artistic images from inputs at lower resolutions. In particular, the upsampling block 612 of the distilled artistic-effect neural network generator 116 increases spatial resolution while maintaining the representation of an input image.

To illustrate, in at least one embodiment, the artistic-effect generation system 106 captures video streams at a 2K. The artistic-effect generation system 106 feeds the 2K video stream into the distilled artistic-effect neural network generator 116. As part of generating the synthesized artistic video stream at the first resolution (e.g., 2K), the artistic-effect generation system 106 bypasses the upsampling block 612 to generate the artistic video stream in real time. Based on receiving an indication of a capture event, the artistic-effect generation system 106 adjusts the distilled artistic-effect neural network generator 116 to utilize the upsampling block 612. With the utilization of the upsampling block 612, the artistic-effect generation system 106 generates an artistic video and/or an artistic video stream at the higher second resolution (e.g., 4K).

Figure 7A:
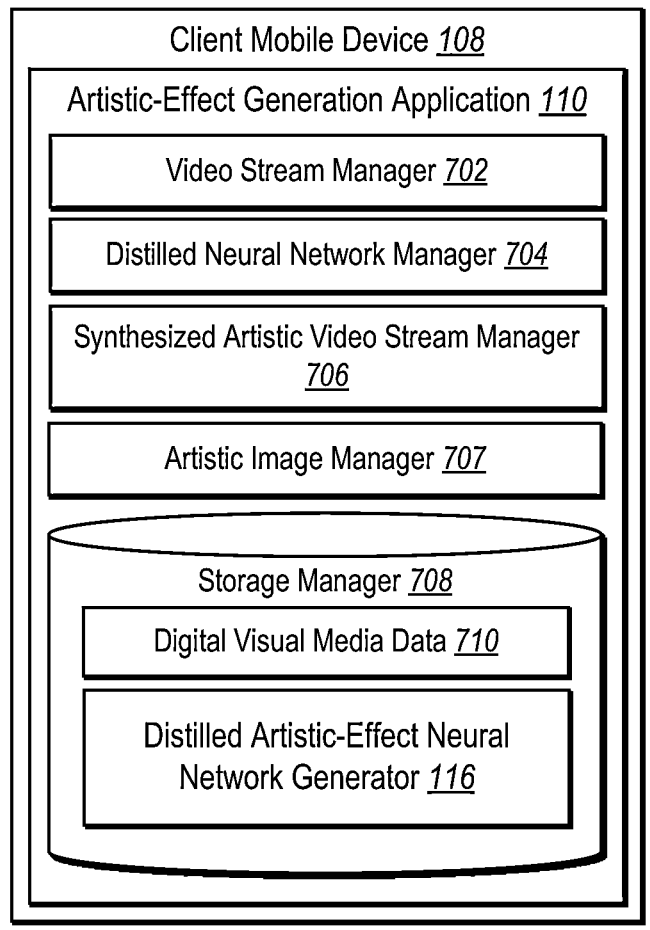
FIG. 7A illustrates a schematic diagram of an example architecture of the artistic-effect generation application in accordance with one or more embodiments of the present disclosure.
Figure 7B:
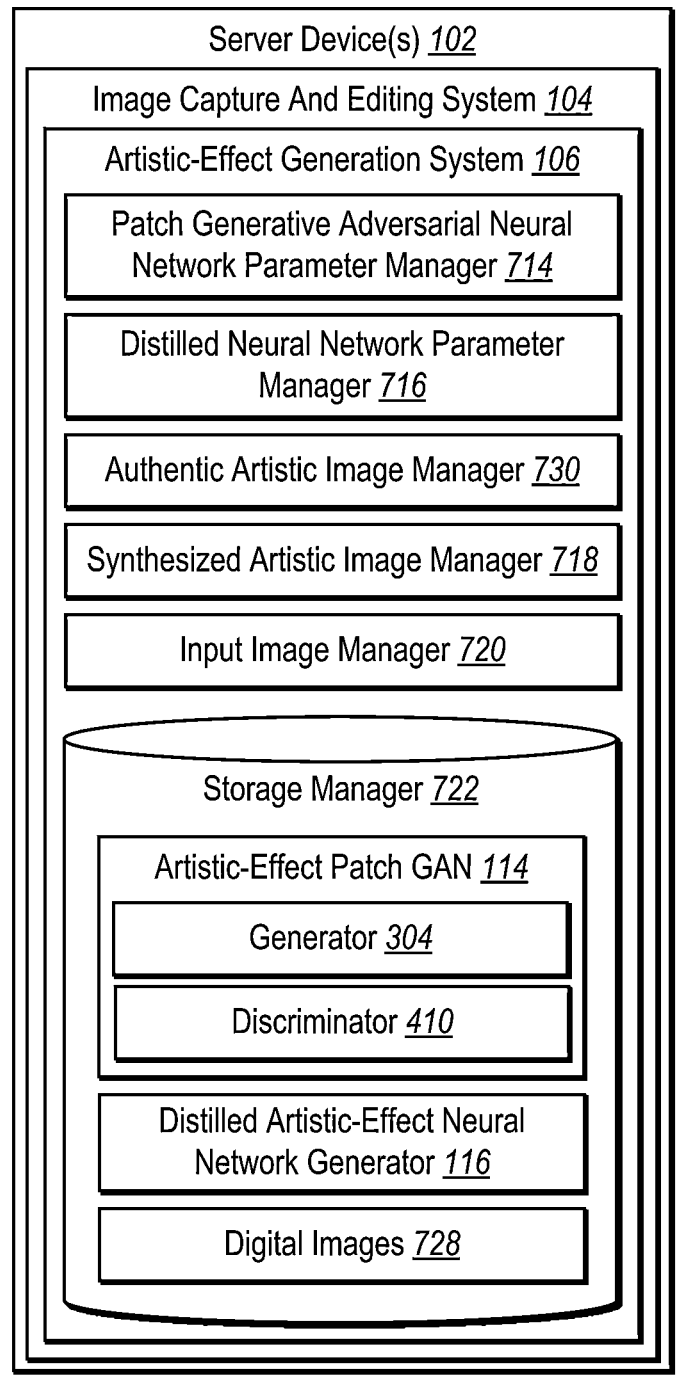
FIG. 7B illustrates a schematic diagram of an example architecture of the artistic-effect generation system in accordance with one or more embodiments of the present disclosure.

FIGS. 7A-7B provide additional detail regarding various components and capabilities of the artistic-effect generation system 104 and the artistic-effect generation system 106. Generally, FIG. 7A illustrates the artistic-effect generation application 110 implemented by the mobile client device 108, and FIG. 7B illustrates the associated artistic-effect generation system 106 implemented by the server device(s) 102. In particular, as illustrated in FIG. 7A, the artistic-effect generation application 110 includes, but is not limited to, a video stream manager 702, a distilled neural network manager 704, a synthesized artistic video stream manager 706, an artistic image manager 707, and a storage manager 708 (which includes digital visual media data 710 and the distilled artistic-effect neural network generator 116).

As just mentioned, and as illustrated in FIG. 7A, the artistic-effect generation application 110 includes the video stream manager 702. In one or more embodiments, the video stream manager 702 captures and manages video streams. In particular, the video stream manager 702 accesses a camera associated with the mobile client device 108. The video stream manager 702 determines to capture video streams comprising a plurality of frames.

Additionally, as illustrated in FIG. 7A, the artistic-effect generation application 110 includes the distilled neural network manager 704. Generally, the distilled neural network manager 704 manages and utilizes the distilled artistic-effect neural network generator 116. In particular, the distilled neural network manager 704 utilizes the distilled artistic-effect neural network generator 116 to generate a synthesized artistic video stream at a first resolution by applying an artistic-effect to a plurality of frames from a video stream. Furthermore, the distilled neural network manager 704 utilizes the distilled artistic-effect neural network generator 116 to generate an artistic image at a second resolution that is higher than the first resolution based on an indication of a capture event.

As illustrated in FIG. 7A, the artistic-effect generation application 110 includes the synthesized artistic video stream manager 706. In particular, the synthesized artistic video stream manager 706 accesses and manages artistic video streams at a first resolution generated by the distilled artistic-effect neural network generator 116. For example, in some embodiments, the synthesized artistic video stream manager 706 provides, for display via a viewfinder of the mobile client device 108, the synthesized artistic video stream.

As further illustrated in FIG. 7A, the artistic-effect generation application 110 includes the artistic image manager 707. In particular, the artistic image manager 707 receives and manages artistic images at a second resolution. For example, the artistic image manager 707, receives artistic images generated by the distilled artistic-effect neural network generator 116. Additionally, the artistic image manager 707 can manage both stand-alone artistic images and artistic images that comprise frames of synthesized artistic videos.

The artistic-effect generation application 110 also includes the storage manager 708. The storage manager 708 maintains data for the artistic-effect generation application 110. The storage manager 708 maintains data of any type, size, or kind as necessary to perform the functions of the artistic-effect generation system 106. The storage manager 708, as shown in FIG. 7A, includes the digital visual media data 710 and the distilled artistic-effect neural network generator 116.

The digital visual media data 710 includes information for any digital visual media utilized by the artistic-effect generation application 110. For example, the digital visual media data 710 includes video streams comprising a plurality of frames, synthesized artistic video streams, and artistic images.

As further illustrated in FIG. 7A, the storage manager 708 also includes the distilled artistic-effect neural network generator 116. For example, the mobile client device 108 implements the distilled artistic-effect neural network generator 116. The distilled artistic-effect neural network generator 116 includes data including the model architecture and tuned parameters. The artistic-effect generation system 106 and/or the artistic-effect generation application 110 accesses the distilled artistic-effect neural network generator 116 to create both stylized artistic video streams at a first resolution and artistic images at a second resolution.

FIG. 7B illustrates the server device(s) 102 that implements the artistic-effect generation system 106. In particular, as illustrated in FIG. 7B, the server device(s) 102 includes the image capture and editing system 104 and the artistic-effect generation system 106. The server device(s) 102 includes an artistic-effect patch generative adversarial neural network parameter manager 714, a distilled neural network parameter manager 716, an artistic image manager 718, an input image manager 720, and a storage manager 722. More specifically, the storage manager 722 includes the artistic-effect patch GAN 114 comprising a generator 724 and a discriminator 726, the distilled artistic-effect neural network generator 116, and digital images 728.

As illustrated in FIG. 7B, the artistic-effect generation system 106 includes the artistic-effect patch generative adversarial neural network parameter manager 714. Generally, the artistic-effect patch generative adversarial neural network parameter manager 714 modifies parameters of the artistic-effect patch GAN 114. More specifically, the artistic-effect patch generative adversarial neural network parameter manager 714 generates, utilizing the generator 724, a synthesized artistic image from an input image. The artistic-effect patch generative adversarial neural network parameter manager 714 further generates classifications of patches of the synthesized artistic image as real or fake as compared with patches of authentic artistic images. Furthermore, the artistic-effect patch generative adversarial neural network parameter manager 714 extracts features from the synthesized artistic image, input image, and authentic artistic image. The artistic-effect patch generative adversarial neural network parameter manager 714 also generates comparisons between the features of the synthesized artistic image, the features of the input image, and the features from the authentic artistic image. The artistic-effect patch generative adversarial neural network parameter manager 714 modifies parameters of the generator 724 based on the classifications of the patches and the comparisons between the features of the synthesized artistic image, the features of the input image, and the features of the authentic artistic image. The artistic-effect patch generative adversarial neural network parameter manager 714 also generates and manages losses and other constraints utilized to tune the generator 724.

As further illustrated in FIG. 7B, the artistic-effect generation system 106 includes the distilled neural network parameter manager 716. Generally, the distilled neural network parameter manager 716 manages and tunes the distilled artistic-effect neural network generator 116. In particular, the distilled neural network parameter manager 716 utilizes the generator 724 of the artistic-effect patch GAN 114 to generate a target artistic image from a sample input image. The distilled neural network parameter manager 716 further utilizes the distilled artistic-effect neural network generator 116 to generate a learning artistic image from the sample input image. The distilled neural network parameter manager 716 further generates a comparison between the target artistic image and the learning artistic image. The distilled neural network parameter manager 716 also extracts and generates comparisons between features from the learning artistic image, the sample input image, and the target artistic image. The distilled neural network parameter manager 716 modifies parameters of the distilled artistic-effect neural network generator based on the comparison between the target artistic image and the learning artistic image as well as the comparisons between features of the learning artistic image, the sample input image, and the target artistic image. More specifically, the distilled neural network parameter manager 716 determines and generates losses and constraints utilized to tune the distilled artistic-effect neural network generator 116.

As illustrated in FIG. 7B, the artistic-effect generation system 106 includes the authentic artistic image manager 730. In particular, the authentic artistic image manager 730 accesses and manages authentic artistic images utilized by the artistic-effect generation system 106 to tune parameters of the generator 724.

The artistic-effect generation system 106 illustrated in FIG. 7B includes the artistic image manager 718. In particular, the synthesized artistic image manager 718 manages synthesized artistic images created by the generator 724. In some embodiments, the synthesized artistic image manager 718 also manages artistic images generated by the distilled artistic-effect neural network generator 116. For example, in some embodiments the synthesized artistic image manager 718 manages synthesized artistic images, target artistic images, and learning artistic images.

The artistic-effect generation system 106 illustrated in FIG. 7B also includes the input image manager 720. The input image manager 720 accesses and manages images utilized in the process of modifying parameters of the artistic-effect patch GAN 114 and the distilled artistic-effect neural network generator 116. In particular, the input image manager 720 accesses input images utilized to tune the generator 704 as well as sample input images utilized to tune parameters of the distilled artistic-effect neural network generator 116.

As further illustrated in FIG. 7B, the artistic-effect generation system 106 includes the storage manager 722. The storage manager 722 maintains data for the artistic-effect generation system 106. The storage manager 722 maintains data of any type, size, or kind as necessary to perform the functions of the artistic-effect generation system 106. The storage manager 722, as shown in FIG. 7B, includes the artistic-effect patch GAN 114, the distilled artistic-effect neural network generator 116, and the digital images 728.

As illustrated in FIG. 7B, the artistic-effect patch GAN 114 includes the generator 724 and the discriminator 726. In particular, artistic-effect patch GAN 114 stores the generator 724 and the discriminator 726 tuned by the artistic-effect generation system 106. In some embodiments, generator 724 generates synthesized artistic images as well as target artistic images utilized in modifying parameters of the distilled artistic-effect neural network generator 116. The discriminator 726 generates classifications of patches of synthesized artistic images as real or fake as compared with patches of authentic artistic images.

As further illustrated in FIG. 7B, the storage manager 722 includes the distilled artistic-effect neural network generator 116. In particular, the distilled artistic-effect neural network generator 116 stores the distilled artistic-effect neural network tuned by the distilled neural network parameter manager 716 and utilized by the artistic-effect generation system 106. In some embodiments, the artistic-effect generation system 106 creates a copy of the distilled artistic-effect neural network generator 116 and sends the copy for utilization on the mobile client device 108.

As illustrated in FIG. 7B, the storage manager 722 includes the digital images 728. The digital images 728 store digital images utilized by the artistic-effect generation system 106 in modifying parameters of the artistic-effect patch GAN 114 and the distilled artistic-effect neural network generator 116. In particular the digital images 728 include input images and authentic artistic images utilized in tuning parameters of the generator 724. Furthermore, the digital images 728 include sample input images utilized to tune parameters of the distilled artistic-effect neural network generator.

Figure 8:
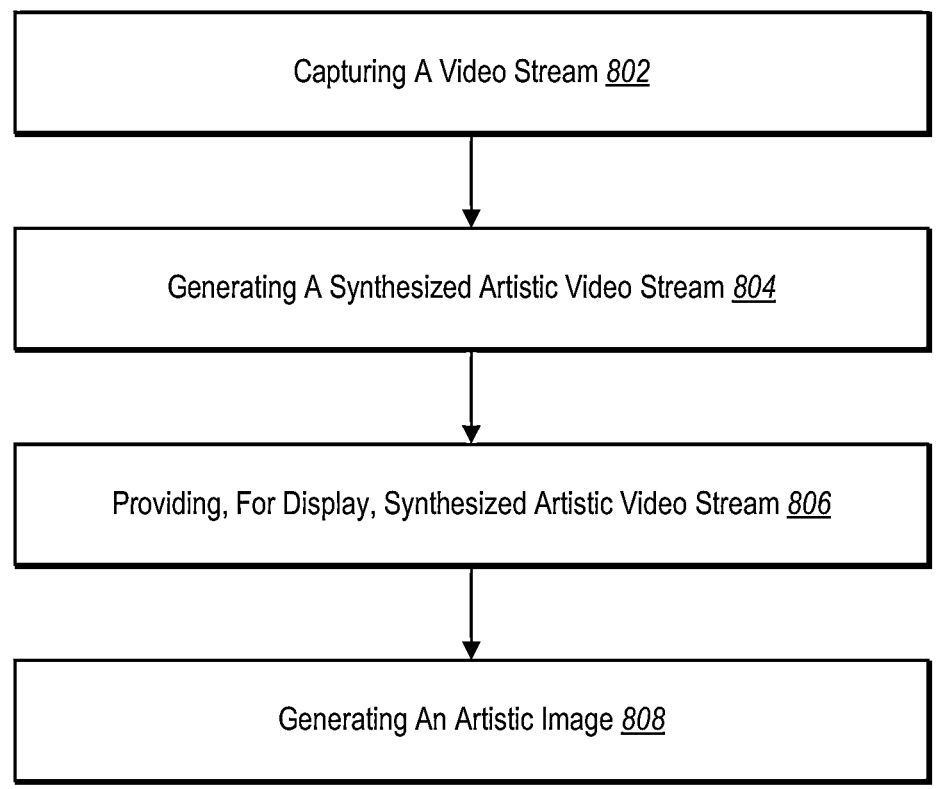
FIG. 8 illustrates a series of acts for generating an artistic image in accordance with one or more embodiments of the present disclosure.
Figure 9:
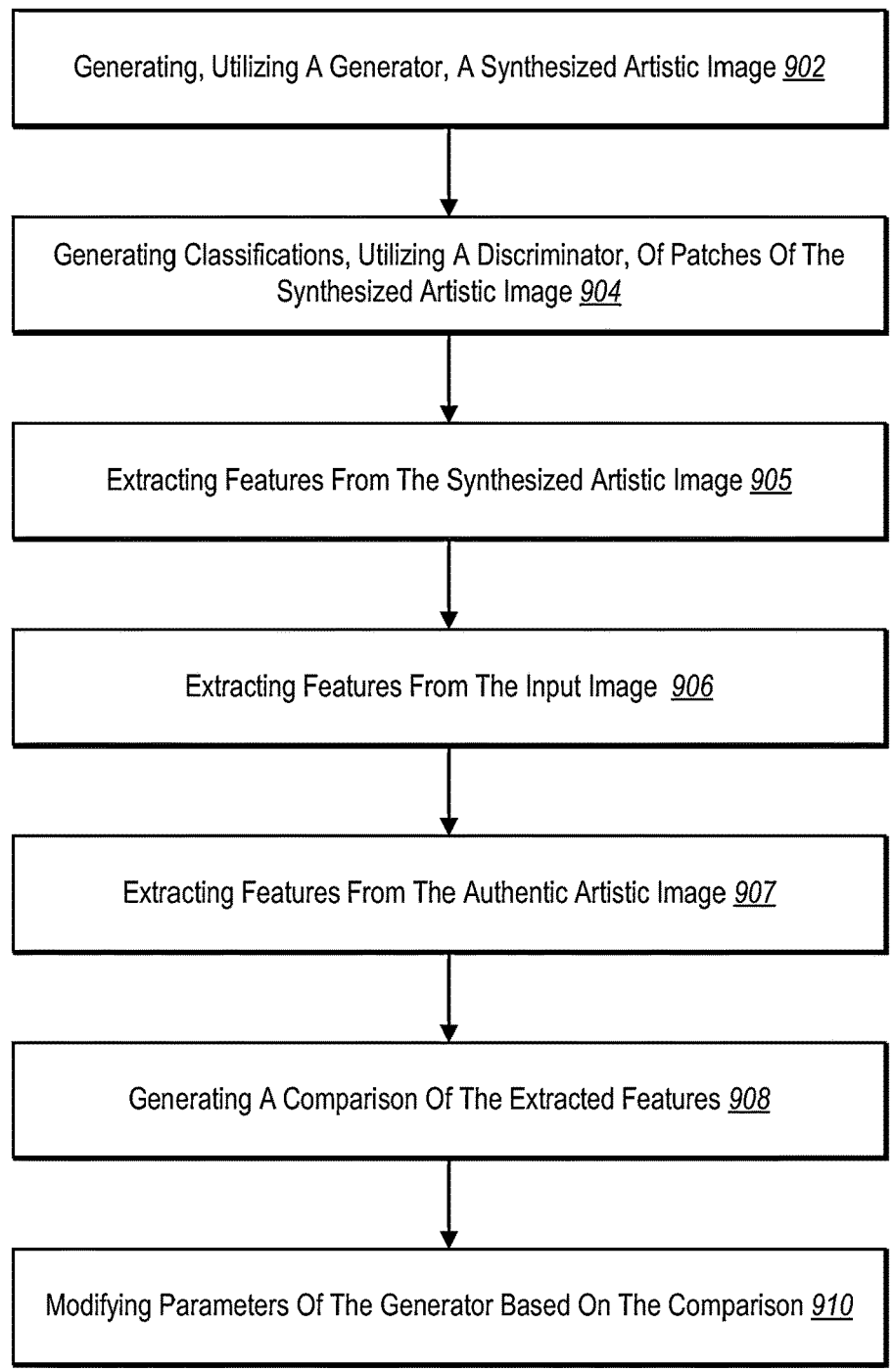
FIG. 9 illustrates a series of acts for modifying parameters of a generator of an artistic-effect patch generative adversarial neural network in accordance with one or more embodiments of the present disclosure.
Figure 10:
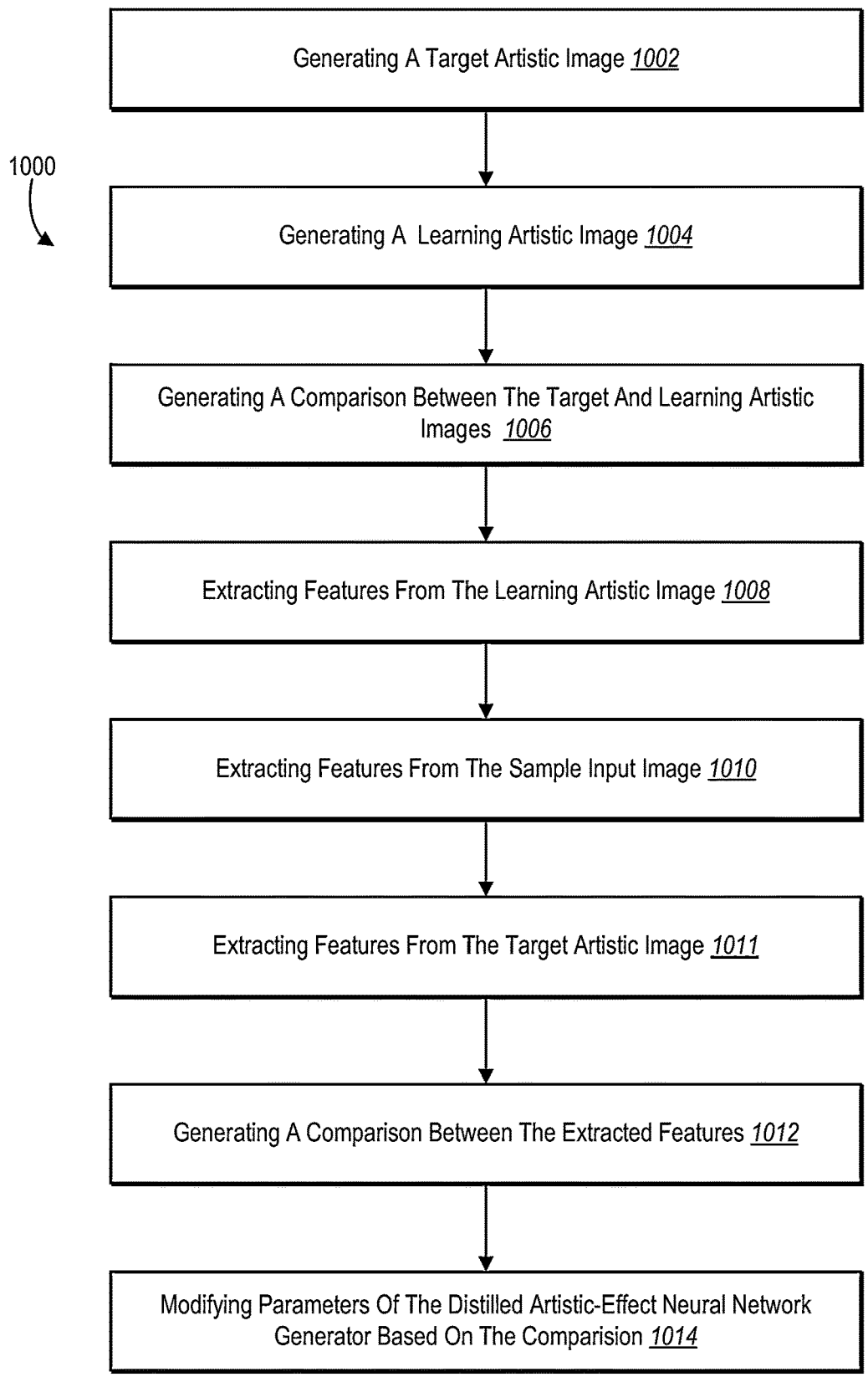
FIG. 10 illustrates a series of acts for modifying parameters of the distilled artistic-effect neural network generator in accordance with one or more embodiments of the present disclosure.

FIGS. 1-7B, the corresponding text, and the examples provide a number of different methods, systems, devices, and non-transitory computer-readable media of the artistic-effect generation system 106. In addition to the foregoing, one or more embodiments can also be described in terms of flowcharts comprising acts for accomplishing the particular result, as shown in FIGS. 8-10. The acts illustrated in FIGS. 8-10 may be performed with more or fewer acts. Further, the illustrated acts may be performed in different orders. Additionally, the acts described herein may be repeated or performed in parallel with one another or in parallel with different instances of the same or similar acts.

FIG. 8 illustrates a flowchart of a series of acts 800 for generating an artistic image. In particular, the series of acts 800 includes an act 802 of capturing a video stream, an act 804 of generating a synthesized artistic video stream, and an act 806 of providing, for display, the synthesized artistic video stream, and an act 808 of generating an artistic image.

As illustrated in FIG. 8, the series of acts 800 includes the act 802 of capturing a video stream. In particular, the act 802 comprises capturing, utilizing the camera, a video stream comprising a plurality of frames.

The series of acts 800 further includes the act 804 of generating a synthesized artistic video stream. In particular, the act 804 comprises generating, in real-time utilizing the distilled artistic-effect neural network generator, a synthesized artistic video stream at a first resolution by applying an artistic-effect to the plurality of frames from the video stream. In one or more embodiments the artistic-effect comprises an anime style. Furthermore, in one or more embodiments, the distilled artistic-effect neural network generator comprises convolutional blocks comprising a single upsampling block and efficient separable convolutions.

The series of acts 800 includes the act 806 of providing, for display, the synthesized artistic video stream. In particular, the act 806 comprises providing, for display via a viewfinder, the synthesized artistic video stream.

The series of acts 800 further includes the act 808 of generating an artistic image. In particular, the act 808 comprises generating, based on an indication of a capture event and utilizing the distilled artistic-effect neural network generator, an artistic image comprising a frame from the synthesized artistic video stream with the artistic-effect at a second resolution that is higher than the first resolution.

In one or more embodiments, the series of acts 800 further comprises an act of generating, based on an indication of a video capture event, an artistic video at a 4K resolution. In some embodiments, the series of acts 900 is performed on a system comprising a mobile computing device. Furthermore, in one or more embodiments, the series of acts 800 includes the additional act of, based on an indication of a selection of a second artistic-effect, generating, in real time utilizing a second distilled artistic-effect neural network generator, a second synthesized artistic video stream at the first resolution by applying the second artistic-effect to the plurality of frames from the video stream.

FIG. 9 illustrates a flowchart of a series of acts 900 for modifying parameters of a generator of an artistic-effect patch GAN. In particular, the series of acts 900 includes an act 902 of generating, utilizing a generator, a synthesized artistic image, an act 904 of generating classifications, utilizing a discriminator, of patches of the synthesized artistic image, an act 905 of extracting features from the synthesized artistic image, an act 906 of extracting features from the input image, an act 907 of extracting features from the authentic artistic image, an act 908 of generating a comparison of the extracted features, and an act 910 of modifying parameters of the generator based on the comparison.

As illustrated in FIG. 9, the series of acts 900 includes the act 902 of generating, utilizing a generator, a synthesized artistic image. In particular, the act 902 comprises generating, utilizing a generator of an artistic-effect patch generative adversarial neural network, a synthesized artistic image from an input image.

The series of acts 900 includes the act 904 of generating classifications, utilizing a discriminator, of patches of the synthesized artistic image. In particular, the act 904 comprises generating classifications, utilizing a discriminator of the artistic-effect patch generative adversarial neural network, of patches of the synthesized artistic image as real or fake as compared with patches of an authentic artistic image.

The series of acts 900 illustrated in FIG. 9 further includes the act 905 of extracting features from the synthesized artistic image. In one or more embodiments, the act 905 comprises extracting the features from the synthesized artistic image by extracting, utilizing a convolutional neural network, synthesized artistic image deep features from the synthesized artistic image.

Additionally, the series of acts 900 includes the act 906 of extracting features from the input image. In one or more embodiments, the act 906 comprises extracting the features from the input image by extracting, utilizing the convolutional neural network, input image deep features from the input image.

As illustrated in FIG. 9, the series of acts 900 includes the act 907 of extracting features from the authentic artistic image. In one or more embodiments, the act 907 comprises extracting the features from the authentic artistic image by extracting, utilizing the convolutional neural network, authentic artistic image deep features from the authentic artistic image.

The series of acts 900 includes the act 908 of generating a comparison of the extracted features. In particular, the act 908 comprises generating comparisons between the features of the synthesized artistic image, the features of the input image, and the features of the authentic artistic image. In one or more embodiments, the act 908 further comprises generating the comparison between the features of the synthesized artistic image and the features of the input image by generating a content loss that compares the synthesized artistic image deep features with the input image deep features.

As further illustrated in FIG. 9, the series of acts 900 includes the act 910 of modifying parameters of the generator based on the comparison. In particular, the act 910 comprises modifying parameters of the generator of the patch generator adversarial neural network based on the classifications of the patches and the comparisons between the features of the synthesized artistic image, the features of the input image, and the features of the authentic artistic image.

In one or more embodiments, the series of acts 900 further includes the acts of generating a blur loss utilizing the discriminator of the artistic-effect patch generative adversarial neural network, wherein the blur loss penalizes blurred synthesized artistic images; and further modifying the parameters of the generator of the patch generator adversarial neural network based on the blur loss. In one or more embodiments, the additional acts further comprise the act of generating the blur loss by: generating sample blurred artistic images; and feeding patches of the sample blurred artistic images as fake samples to the discriminator of the artistic-effect patch generative adversarial neural network to encourage the artistic-effect patch generative adversarial neural network to output images with sharper edges.

In one or more embodiments, the series of acts 900 include additional acts of generating an authentic artistic image gram matrix based on authentic artistic image deep features; generating a synthesized artistic image gram matrix based on the synthesized artistic image deep features; and generating the comparison between the features of the synthesized artistic image and the features of the authentic artistic image by generating a style loss that compares the authentic artistic image gram matrix and the synthesized artistic image gram matrix.

Additionally, in one or more embodiments, the series of acts 900 includes additional acts of extracting the features from the synthesized artistic image by generating color features for the synthesized artistic image by encoding the synthesized artistic image into a YUV color space; extracting the features from the input image by generating color features for the input image by encoding the input image into the YUV color space; and generating the comparison between the features of the synthesized artistic image and the features of the input image by generating a color loss that compares the color features for the synthesized artistic image and the color features for the input image.

FIG. 10 illustrates a flowchart of a series of acts 1000 for modifying parameters of the distilled artistic-effect neural network generator. In particular, the series of acts 1000 includes an act 1002 of generating a target artistic image, an act 1004 of generating a learning artistic image, an act 1006 of generating a comparison between the target and learning artistic images, an act 1008 of extracting features form the learning artistic image, an act 1010 of extracting features from the sample input image, an act 1011 of extracting features from the target artistic image, an act 1012 of generating a comparison between the extracted features, and an act 1014 of modifying parameters of the distilled artistic-effect neural network generator based on the comparison.

As illustrated in FIG. 10, the series of acts 100 includes the act 1002 of generating a target artistic image. In particular, the act 1002 comprises generating, utilizing a generator of an artistic-effect patch generative adversarial neural network, a target artistic image from a sample input image.

The series of acts 1000 includes the act 1004 of generating a learning artistic image. In particular, the act 1004 comprises generating, utilizing a distilled artistic-effect neural network generator, a learning artistic image from the sample input image. In one or more embodiments, the distilled artistic-effect neural network generator comprises separable convolutions.

The series of acts 1000 further includes the act 1006 of generating a comparison between the target and learning artistic images. In particular, the act 1006 comprises generating a comparison between the target artistic image and the learning artistic image.

The series of acts 1000 also includes the act 1008 of extracting features from the learning artistic image. In one or more embodiments, the act 1008 further comprises extracting the features from the learning artistic image and extracting the features from the sample input image by extracting, utilizing a convolutional neural network, content features and style features from the learning artistic image and from the sample input image.

As illustrated in FIG. 10, the series of acts 1000 includes the act 1010 of extracting features from the sample input image.

The series of acts 1000 illustrated in FIG. 10 further includes the act 1011 of extracting features from the target artistic image.

The series of acts 1000 includes the act 1012 of generating a comparison between the extracted features. In particular, the act 1012 comprises generating comparisons between the features of the learning artistic image, the features of the sample input image, and features of the target artistic image. In one or more embodiments, the act 1012 comprises generating the comparison between the target artistic image and the learning artistic image by comparing the target artistic image and the learning artistic image to generate a mean square error loss. Additionally, in one or more embodiments, the act 1012 further comprises generating a comparison between the features of the learning artistic image and the features of the sample input image by: generating a content loss that compares feature maps between the learning artistic image and the sample input image; and generating a color loss that compares colors between the learning artistic image and the sample input image. Furthermore, in some embodiments, the act 1012 further comprises generating a comparison between the features of the learning artistic image and the features of the target artistic image by generating a style loss that compares textures between the learning artistic image and the target artistic image.

As further illustrated in FIG. 10, the series of acts 1000 includes the act 1014 of modifying parameters of the distilled artistic-effects neural network generator based on the comparison. In particular, the act 1014 comprises modifying parameters of the distilled artistic-effect neural network generator based on the comparison between the target artistic image and the learning artistic image and the comparisons between the features of the learning artistic image, the features of the sample input image, and the features of the target artistic image. In some embodiments, the series of acts 1000 includes an additional act of providing the distilled artistic-effect neural network generator for utilization at a mobile computing device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
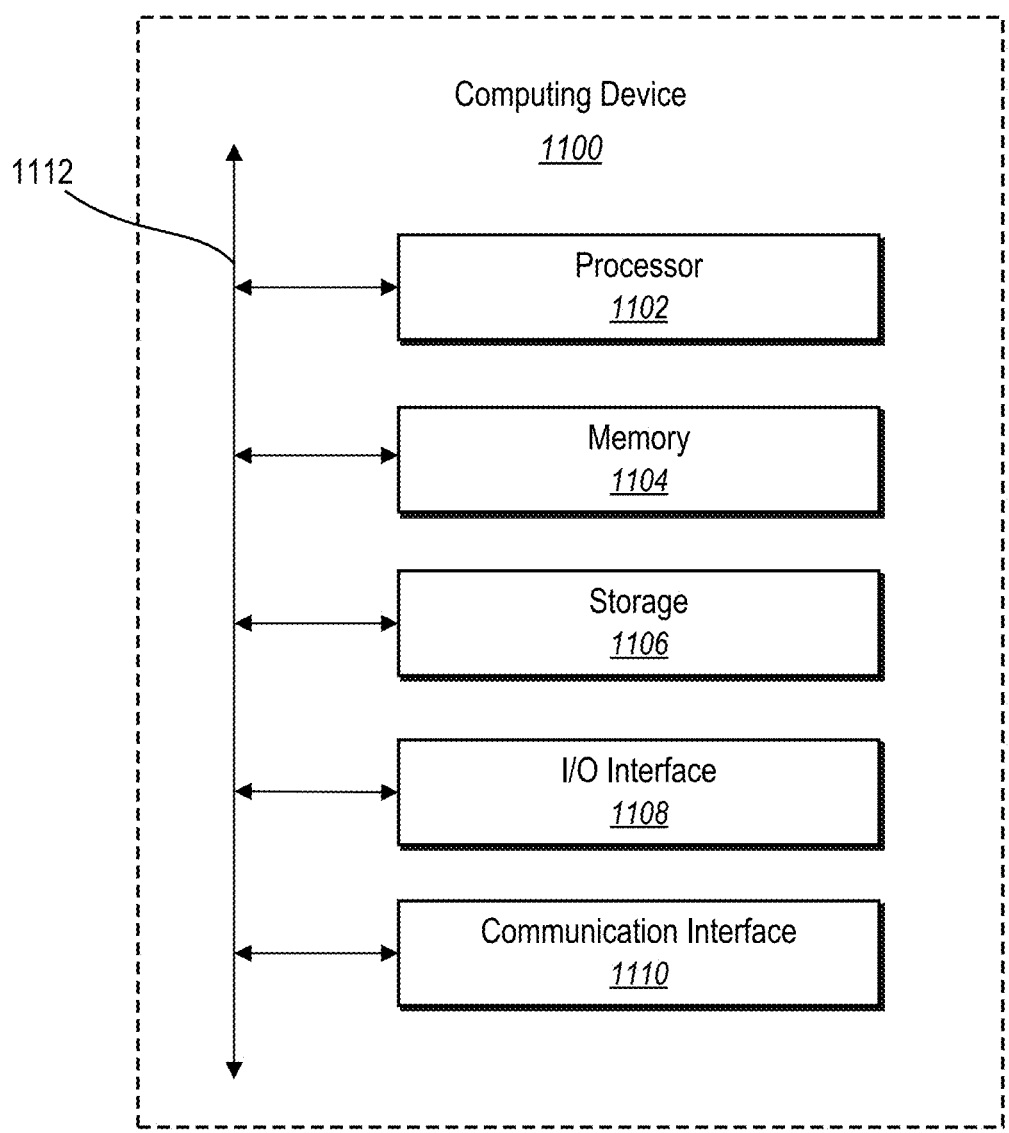
FIG. 11 illustrates a block diagram of an example computing device in accordance with one or more embodiments of the present disclosure.

FIG. 11 illustrates a block diagram of a computing device 1100 that may be configured to perform one or more of the processes described above. One will appreciate that one or more computing devices such as the computing device 1100 may implement the artistic-effect generation system 106 and the image capture and editing system 104. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A system comprising:
a camera;
one or more memory devices comprising an artistic-effect neural network; and
at least one processing device coupled to the one or more memory devices, the at least one processing device to perform operations comprising:
capturing, utilizing the camera, a video stream comprising a plurality of frames;
generating, in real-time utilizing the artistic-effect neural network, a synthesized artistic video stream at a first resolution by applying an artistic-effect to the plurality of frames from the video stream;
providing, for display via a viewfinder as the video stream is being captured, the synthesized artistic video stream at the first resolution; and
generating, based on an indication of a capture event and utilizing the artistic-effect neural network, an artistic image comprising a frame from the synthesized artistic video stream with the artistic-effect at a second resolution that is higher than the first resolution.

2. The system as recited in claim 1, wherein generating, based on the indication of the capture event and utilizing the artistic-effect neural network, the artistic image comprises generating the artistic image at a 4K resolution.

3. The system as recited in claim 1, wherein the system comprises a mobile computing device.

4. The system as recited in claim 3, wherein the artistic-effect comprises an anime style.

5. The system as recited in claim 3, wherein the artistic-effect neural network comprises convolutional blocks comprising a single upsampling block and efficient separable convolutions.

6. The system as recited in claim 3, wherein the operations further comprise generating, based on an indication of a selection of a second artistic-effect, in real time utilizing a second artistic-effect neural network, a second synthesized artistic video stream at the first resolution by applying the second artistic-effect to the plurality of frames from the video stream.

7. A non-transitory computer-readable medium storing executable instructions, which when executed by a processing device, cause the processing device to perform operations comprising:
capturing, utilizing a camera, a video stream comprising a plurality of frames;
generating, utilizing an artistic-effect neural network, a synthesized artistic video stream at a first resolution by applying an artistic-effect to the plurality of frames from the video stream;
providing, for display via a viewfinder, the synthesized artistic video stream at the first resolution as the video stream is being captured; and
generating, based on an indication of a capture event and utilizing the artistic-effect neural network, an artistic image comprising a frame from the synthesized artistic video stream with the artistic-effect at a second resolution that is higher than the first resolution.

8. The non-transitory computer-readable medium of claim 7, wherein generating, in real-time utilizing the artistic-effect neural network, the synthesized artistic video stream at the first resolution allows for a real-time display of the synthesized artistic video stream as the video stream is being captured.

9. The non-transitory computer-readable medium of claim 7, wherein generating, utilizing the artistic-effect neural network, the artistic image at the second resolution comprises generating the artistic image at a resolution that is twice the first resolution.

10. The non-transitory computer-readable medium of claim 7, wherein the operations further comprise generating and displaying via a graphical user interface including the viewfinder, a plurality of different artistic effect previews; and
wherein generating, utilizing the artistic-effect neural network, the synthesized artistic video stream at the first resolution by applying the artistic-effect to the plurality of frames from the video stream is in response to a selection of an artistic effect preview corresponding to an artistic effect.

11. The non-transitory computer-readable medium of claim 10, wherein the operations further comprise:
receiving a selection of a second artistic effect preview;
generating, based on the selection of the second artistic effect preview, utilizing a second artistic-effect neural network, a second synthesized artistic video stream at the first resolution by applying a second artistic-effect to the plurality of frames from the video stream; and
replacing the display of the synthesized artistic video stream in the viewfinder with the second synthesized artistic video stream.

12. The non-transitory computer-readable medium of claim 7, wherein the operations further comprise displaying the artistic image in place of the synthesized artistic video stream.

13. The non-transitory computer-readable medium of claim 7, wherein generating, utilizing the artistic-effect neural network, the artistic image comprises upsampling within the artistic-effect neural network.

14. A method comprising:
capturing, utilizing a camera, a video stream comprising a plurality of frames;
generating, in real-time utilizing an artistic-effect neural network, a synthesized artistic video stream at a first resolution by applying an artistic-effect to the plurality of frames from the video stream;

providing, for display via a viewfinder as the video stream is being captured, the synthesized artistic video stream at the first resolution; and generating, based on an indication of a capture event and utilizing the artistic-effect neural network, an artistic image comprising a frame from the synthesized artistic video stream with the artistic-effect at a second resolution that is higher than the first resolution.

15. The method of claim 14, wherein generating, based on the indication of the capture event and utilizing the artistic-effect neural network, the artistic image comprises generating the artistic image at a 4K resolution.

16. The method of claim 14, wherein:

capturing, utilizing the camera, the video stream comprises capturing the video stream utilizing a mobile phone; and providing, for display via the viewfinder, the synthesized artistic video stream, comprises displaying the synthesized artistic video stream on the mobile phone.

17. The method of claim 14, wherein generating, the artistic image with the artistic-effect comprises generating an artistic image with a painting style.

18. The method of claim 14, further comprising generating, based on an indication of a selection of a second artistic-effect, in real time utilizing a second artistic-effect neural network, a second synthesized artistic video stream at the first resolution by applying the second artistic-effect to the plurality of frames from the video stream.

19. The method of claim 14, further comprising generating and displaying via a graphical user interface including the viewfinder, a plurality of different artistic effect previews; and wherein generating, in real-time utilizing the artistic-effect neural network, the synthesized artistic video stream at the first resolution by applying the artistic-effect to the plurality of frames from the video stream is in response to a selection of an artistic effect preview corresponding to an artistic effect.

20. The method of claim 14, wherein generating, utilizing the artistic-effect neural network, the artistic image comprises upsampling within the artistic-effect neural network.

* * * * *